United States Patent [19]

Rossignac et al.

[11] Patent Number: 5,905,507
[45] Date of Patent: *May 18, 1999

[54] COMPRESSION OF GEOMETRIC MODELS USING SPANNING TREES

[75] Inventors: Jarek Jaroslaw Roman Rossignac, Cronton-on-Hudson; Gabriel Taubin, Hartsdale, both of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/685,422

[22] Filed: Jul. 30, 1996

Related U.S. Application Data

[60] Provisional application No. 60/010,045, Jan. 16, 1996.

[51] Int. Cl.⁶ ................................................... G06F 15/00
[52] U.S. Cl. ............................................................ 345/440
[58] Field of Search ................................... 345/443, 440, 345/441, 118, 121

[56] References Cited

U.S. PATENT DOCUMENTS

| | | | |
|---|---|---|---|
| 5,606,654 | 2/1997 | Schuur | 395/140 |
| 5,640,500 | 6/1997 | Taylor | 395/140 |

FOREIGN PATENT DOCUMENTS

757333A2  5/1997  European Pat. Off. .

OTHER PUBLICATIONS

J. Neider et al., "Open GL Programming Guide," Addison–Wesley Publishing Company, Jun. 1993, pp. 34–37.
C.W. Brown et al., "Graphics File Formats," Manning Publishing Company, 1995, pp. vii–218.
J. D. Foley et al., "Computer Graphics" 2nd Edition, Addison–Wesley Publishing Company, Nov. 1992, pp. 471–477.
R. E. Tarjan, "Data Structures and Network Algorithms," Society for Industrial and Applied Mathematics, Philadelphia, PA 1983, pp. 14–21.
M. Deering, "Geometry Compression," ACM–0–89791–701 Apr. 1995, Computer Graphics Proceedings, Annual Conference Series, 1995.

*Primary Examiner*—Phu K. Nguyen
*Attorney, Agent, or Firm*—Louis J. Percello

[57] ABSTRACT

A computer system stores and transmits compressed triangular meshes. The computer uses a data structure that represents a triangular mesh in n-dimensional space. The data structure has a table of vertex runs, a table of triangle runs, zero or more marching records, which provide the connectivity information of the triangular mesh. The data structure also has zero or more associated data records that include the geometric information of the triangular mesh. The table of triangle runs and the marching record have information that describes how to construct a triangular mesh (therefore, the polygon vertices and the boundary edges). The table of vertex runs describes a vertex spanning tree that provides additional connectivity information to construct the triangular mesh from the polygon. The associated data record determines the exact position of the triangular mesh in space. The system also includes ways for creating this data structure from a triangular mesh, transmitting this information between computers, and compressing and decompressing this transmitted information.

32 Claims, 16 Drawing Sheets

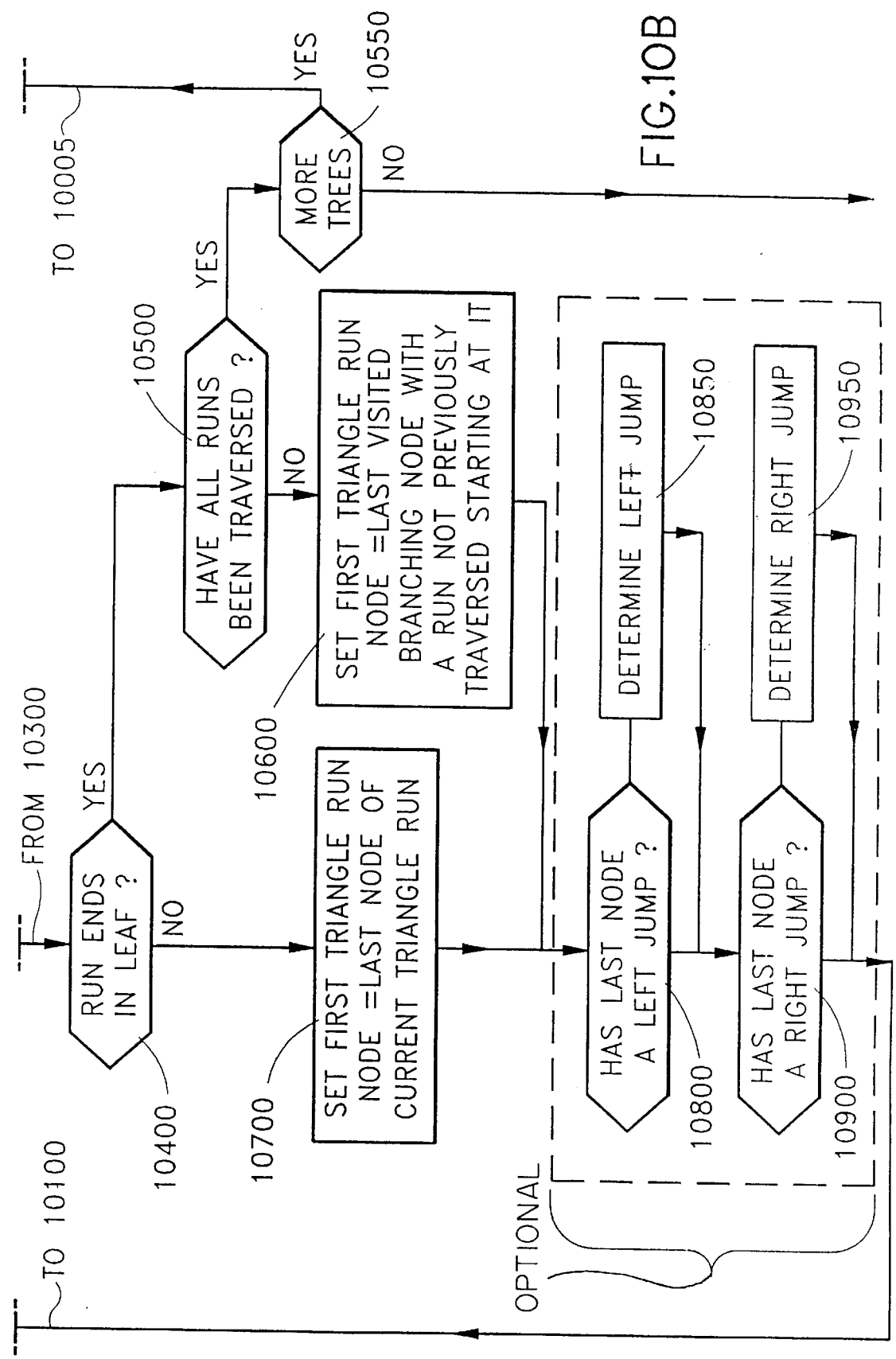

COMPRESSION OF GEOMETRIC MODELS USING SPANNING TREES

CROSS-REFERENCE TO RELATED APPLICATIONS

The present application claims priority to co-pending U.S. provisional application 60/010,045, filed on Jan. 16, 1996 and entitled "Compression of Geometric Models Using Spanning Trees".

FIELD OF THE INVENTION

This invention relates to the field of computer graphics. More specifically, the invention relates to the compressed transmission and storage of three dimensional geometric models.

BACKGROUND OF THE INVENTION

Although modeling systems in Mechanical Computer Aided Design and in animation are expanding their geometric domain to free form surfaces, polyhedral models remain the primary 3D representation used in the manufacturing, architectural, Geographic Information Systems, geoscience, and entertainment industries. Polyhedral models are particularly effective for hardware assisted rendering, which is important for video-games, virtual reality, fly-through, and electronic mock-up applications involving complex Computer Aided Design models.

In comparison to image and video compression, little attention has been devoted to the compression of 3D shapes, both from the research community and from 3D data exchange standards committees. This situation is likely to change rapidly for three reasons. 1) The exploding complexity of industrial Computer Aided Design models raises significantly the cost of the memory and auxiliary storage required by these models. 2) The distribution of 3D models over networks for collaborative design, gaming, rapid prototyping, or virtual interactions is seriously limited by the available bandwidth. 3) The graphics performance of high level hardware adapters is limited by insufficient on-board memory to store the entire model or by a data transfer bottleneck.

Since methods are known in the prior art for easily and efficiently triangulating arbitrary polygonal faces, it is sufficient to consider geometric models defined by triangular meshes. A triangular mesh is defined by the position of its vertices (geometry), which are n-dimensional vectors, by the association between each triangle and its sustaining vertices (connectivity), and by colors, normals, and texture coordinates (photometry), which does not affect the 3D geometry, but influences the way it is shaded.

The prior art in 3D geometric compression may be divided into three categories: simplification, geometry encoding, and connectivity encoding.

Polyhedral simplification techniques reduce the number of vertices in the mesh by altering the model's connectivity and by possibly adjusting the position of the remaining vertices to minimize the error produced by the simplification. These techniques target the generation of multiple levels of detail (LOD) for accelerated graphics or data reduction for over-sampled meshes. Although these techniques could be considered for lossy compression, they are inappropriate for applications that require access to the exact connectivity of the model. In fact simplification techniques are orthogonal to the compression techniques described here because geometric compression may be applied to each level of detail.

Geometry encoding techniques use lossy or lossless compression to reduce the storage necessary for the geometric data associated with vertex positions, and possibly with colors, normals and texture coordinates. Applying general purpose binary compression algorithms to the geometric data stream leads to suboptimal solutions. A geometric compression approach that involves normalizing the geometry into a unit cube and rounding off the vertex coordinates to fixed length integers is described by Michael Deering in "Geometric Compression", Computer Graphics (Proc. SIGGRAPH), pages 13–20, August 1995, which is here incorporated by reference in its entirety. The rounding controls the amount of lost information.

Connectivity encoding techniques attempt to reduce the redundancy inherent to many popular representations of polyhedral or triangular meshes. For example, Connectivity encoding techniques try to minimize the number of bits required to represent without loss of information the triangles of a triangular mesh of V vertices and T triangles.

On one extreme, if the vertices are always organized into a regular 2D grid, the triangle mesh may be completely defined by the number of rows and columns of the grid. Regular grids may be appropriate for terrain modeling in Geographic Information Systems and for rendering uniformly tesselated non-trimmed rectangular parametric patches. However, they are not suitable for modeling the more general 3D shapes found in Computer Aided Design, entertainment, and other applications.

At the other extreme, the vertex positions of a triangular mesh of V vertices and T triangles may be represented with an array, the vertex positions array, and each triangle may be represented by 3 indices into the vertex positions array. This solution does not impose any topological limitations on the mesh, but requires storing 3 addresses per triangle (approximately 6 addresses per vertex for typical triangular meshes). Even if the models were restricted to less than 1000 vertices, this scheme would consume 60 bits per vertex for the connectivity information alone.

Triangle strips used in graphics application programming interfaces (APIs) (described by J. Neider, T. Davis, and M. Woo. in OpenGL Programming Guide, Addison-Wesley, 1993; which is here incorporated by reference in its entirety) provide a compromise where a new vertex is combined with the previous two vertices to implicitly define a new triangle in the current strip. Triangle strips only pay off if one can build long strips, which is a challenging computational geometry problem. Furthermore, because on average a vertex is used twice, either as part of the same triangle strip or of two different ones, the use of triangle strips with OpenGL requires sending most vertices multiple times. The absence of the swap operation further increases this redundancy.

The application of triangle strips as a compression technique, where the locations of all vertices are available for random access during decompression, would still require storing one vertex reference per triangle, two vertex references per strip, the book keeping information on the number and length of the strips, and an additional bit of information per triangle indicating witch open side of the previous triangle should be used as the basis for the next triangle (this bit is equivalent to the SWAP operation in GL).

In Deering's method a stack-buffer is used to store 16 of the previously used vertices instead of having random access to all of the vertices of the model. This is a suitable solution for adapters with very limited on-board memory. Deering also generalizes the triangle strip syntax by providing more general control over how the next vertex is used and by allowing the temporary inclusion of the current vertex on the stack and the reuse of any one of the 16 vertices of the stack-buffer. The storage cost for this connectivity information is: one bit per vertex to indicate whether the vertex should be pushed onto the stack-buffer, two bits per triangle to indicate how to continue the current strip, one bit per triangle to indicate whether a new vertex should be read or whether a vertex from the stack-buffer should be used, and 4 bits of address for selecting a vertex from the stack-buffer, each time an old vertex is reused. Assuming that each vertex is reused only once, the total cost for encoding the connectivity information is: 1+4 bits per vertex plus 2+1 bits per triangle. Assuming 2 triangles per vertex, the total cost is roughly 11 bits per vertex. As far as we know, algorithms for systematically creating good traversals of general meshes using Deering's generalized triangle mesh syntax have not yet been developed. Naive traversal of the mesh may result in many isolated triangles or small runs, implying that a significant portion of the vertices will be sent more than once, and hence increasing the number of bits per triangle. None of the prior art methods for connectivity encoding preserve the original connectivity of the triangular mesh. All of these methods partition the triangular mesh into connected subsets of triangles. The vertices shared by two or more parts are represented multiple times. This may not be a problem when the compression method is meant to be used to better utilize the communication bandwidth between a CPU and a graphics adapter in a computer, but this change of connectivity is a serious disadvantage in other applications which require preserving the topological properties of the original mesh.

FIG. 1, comprising FIG. 1A and FIG. 1B, is a prior art example of trees. The prior art (described by "R. E. Tarjan." in Data Structures and Network Algorithms, SIAM, 1983; which is here incorporated by reference in its entirety) recognizes that a tree 1000 is composed of one or more nodes and one or more edges, each edge connecting a pair of the nodes. A node 1010 connected by a single edge 1015 to another node 1030 is a leaf node. A node 1020 connected by two edges (1025, 1035) to two other nodes (1030, 1050) is a regular node. A node 1030 connected by three or more edges (1015, 1035, 1045) to respective nodes (1010, 1020, and 1055) is a branching node. A tree can be described as a set of one or more runs. A run is a sequence of nodes, with each pair of consecutive nodes connected by an edge. The sequence has a first node that is a leaf or branching node, zero or more intermediate nodes that are regular nodes, and a last node that is a leaf or branching node. For example, the leaf node 1040, the regular nodes 1050 and 1020, and the branching node 1030 define the run (1040,1050,1020,1030).

A rooted tree 1100 is a tree with one of its nodes 1110 identified as a root node. The root node determines a parent-child relation between each pair of nodes connected by an edge. The root node also determines the first and last node of each run. The root node partially determines an order of traversal of the rooted tree. To fully specify the order of traversal, the runs must be further partitioned into one or more sets of common first node runs, each set composed of all the runs that share a common first node, and an ordering must be assigned to the runs within each one of the sets of common first node runs. For example, the choice of node 1110 as the root of the rooted tree 1100 determines that nodes 1120 and 1150 are the first and last nodes of run (1120,1130,1140,1150), respectively, and nodes 1120 and 1180 are the first and last nodes of run (1120,1160,1170, 1180), respectively. But which one of these two runs is traversed first is not determined by the choice of node 1110 as the root of the tree, and has to be explicitly specified.

FIG. 2, comprising FIG. 2A, FIG. 2B, FIG. 2C, FIG. 2D, and FIG. 2E, is prior art example of triangular meshes. A triangular mesh 2100 is composed of vertices 2110, edges 2120, and triangles 2130.

A path on a triangular mesh is a sequence of non-repeated vertices such that each pair of consecutive vertices are connected by an edge. The first and last vertex of a path are said to be connected by the path. For example, the vertices 2140 and 2165 are connected by the path defined by the sequence formed by vertices 2140, 2150, 2160, and 2165. A triangular mesh is connected if every pair of its vertices is connected by a path. For example, the triangular mesh 2100 is connected, and the triangular mesh 2200 is not. When a triangular mesh is not connected it is composed of two or more connected components, where each connected component is a connected triangular mesh composed of a subset of vertices, edges, and triangles of the original triangular mesh and with two vertices of the triangular mesh belonging to the same connected component if they are connected by a path. For example, the triangular mesh 2200 is composed of two connected components, the triangular mesh 2210, and 2220. Vertices 2230 and 2240 belong to the same connected component because they can be connected by a path. Vertices 2230 and 2250 belong to different connected components because there exists no path connecting them.

An edge of a triangular mesh is a boundary edge if it belongs to exactly one triangle, an internal edge if is shared by exactly two triangles, and a singular edge if it is shared by three or more triangles. For example, edge 2350 of triangular mesh 2300 is a boundary edge, all the edges of triangular mesh 2100 are internal edges, and edge 2340, of the triangular mesh 2300 is a singular edge, because it is shared by triangles 2310, 2320, and 2330. (Note that boundary edges and internal edges are also called regular edges.) A vertex of a triangular mesh is a regular vertex if the set of vertices of all the triangles of the triangular mesh that contain the vertex, excluding the given vertex, can be reordered to define a single path. If a vertex is not a regular vertex, then it is a singular vertex. For example, all the vertices of triangular mesh 2100 are regular, and vertex 2410 of triangular mesh 2400 is singular because there is no way of reordering the vertices of all the triangles incident to vertex 2410, excluding vertex 2410, to form a single path. A triangular mesh has boundary if it has one or more boundary edges. For example, the triangular meshes 2100 and 2200 have no boundary, and the triangular meshes 2300 and 2400 have a boundary. A triangular mesh is a manifold if it has no singular vertices and no singular edges. If a triangular mesh is not a manifold, it is a non-manifold. For example, the triangular meshes 2100 and 2200 are manifolds, but the triangular mesh 2300 is a non-manifold.

An orientation of a triangle of a triangular mesh is an ordering of the tree vertices of the triangle, modulo cyclical permutations. Therefore, a triangle of a triangular mesh has two possible orientations. For example, the two different orientations of triangle 2130, composed of vertices 2110, 2170, and 2180, are the orderings (2110,2170,2180) and (2180,2170,2110). But the orderings (2110,2170,2180) and (2180,2110,2170) define the same orientation of the triangle because they are related by a cyclical permutation.

An orientation of an edge of a triangular mesh is one of the two possible orderings of the two vertices of the edge. For example, the two orientations of edge 2120 of the triangular mesh 2100 are defined by the orderings (2110, 2170) and (2170,2110) of the vertices 2110 and 2170. The two orientations of an edge are said to be opposite of each other. An orientation of a triangle induces a consistent orientation on the three incident edges. For example, the orientation (2110,2170,2180) induces the consistent orientations (2110,2170), (2170,2180), and (2180,2110) on the three edges of triangle 2130. A manifold triangular mesh is orientable if an orientation can be chosen for each triangle of the triangular mesh in such a way that for each internal edge of the triangular mesh, the two triangles incident to the edge induce opposite orientations on the common edge. If a manifold triangular mesh is not orientable, then it is non-orientable All non-manifold triangular meshs are non-orientable. For example, triangular mesh 2100 is orientable, and triangular mesh 2500 is non-orientable.

The Euler characteristic of a triangular mesh with V vertices, E edges, and T triangles is the number X=V−E+F. It is known in the prior art (described by "W. S. Massey" in Algebraic Topology: An Introduction, Harcourt, Brace & World, 1967; which is here incorporated by reference in its entirety) that two connected manifold triangular meshes of the same Euler characteristic can be continuously deformed into one another if both are orientable, or both are non-orientable.

A triangular mesh with V vertices and T triangles is usually represented in the prior art (described by "Foley et.al." in Computer Graphics: Principles and Practice, Addison-Wesley, 1990; which is here incorporated by reference in its entirety) by a vertex positions array and a triangle array. The position of each vertex of the triangular mesh is represented in the vertex positions array by n floating point coordinates. Each triangle of the triangular mesh is represented in the triangle array by three indices to the vertex positions array.

For the purposes of this disclosure, a simple triangular mesh is a triangular mesh with n-dimensional vertices that is connected, oriented, manifold, without boundary, and of Euler characteristic 2. For example, triangular mesh 2100 is a simple triangular mesh in 3-dimensional space. For example, every simple triangular mesh can be obtained by triangulating and continuously deforming a sphere. If a triangular mesh is not simple, it is complex. Some examples of complex triangular meshes are shown in FIGS. 2B through 2E.

OBJECTS OF THE INVENTION

An object of this invention is an improved system and method for compressing, storing, transmitting, and decompressing any triangular mesh.

An object of this invention is an improved system and method for representing the connectivity information of any triangular mesh, i.e., which vertices of the triangular mesh form a triangular face of the mesh, without loss of information in compressed form.

An object of this invention is an improved system and method for representing vertex positions, normals, colors, and texture coordinates of any triangular mesh in compressed form.

SUMMARY OF THE INVENTION

The present invention is a computer system and method for compressing, storing, transmitting, and decompressing triangular meshes.

The computer uses a data structure that represents a triangular mesh in compressed form. The data structure has the capability of storing information that permits geometric models (triangular mesh) with non simple (complex) topology to be represented. Complex geometric models can not be represented by a single, planar triangulated polygon by cutting the surface of the geometric model along a vertex spanning tree. Note that the case of a simple triangular mesh was addressed U.S. patent application Ser. No. 08/688,572, entitled "Compression of Simple Geometric Models Using Spanning Trees" that has the same inventors and filing date of this application is herein incorporated by reference in its entirety.

In this invention, the data structure has a table of triangle runs, one marching record, and a table of vertex runs which describe the connectivity information of the triangular mesh. The data structure also has an optional associated data record with information describing the positions of the vertices of the triangular mesh. The data structure may also have one or more additional data records, each additional data record with information describing one of a colors, normals, or texture coordinates of the triangular mesh. In addition, the data structure, has information about "jumps" that permit the connection of multiple triangulated polygons and/or more than two edges that exist in complex geometric models.

The triangular mesh can be represented by one or more triangulated polygons. The triangles in the triangulated polygons are called polygon triangles, there are no internal vertices in the triangulated polygons, the boundary of the polygons are closed, and each of the vertices of the triangular mesh corresponds to one or more vertices lying on the boundary of the polygons. The table of triangle runs and the marching record determine how the polygon is triangulated. To recreate the triangular mesh from the triangulated polygon, the vertices (edges) on the boundary of the triangulated polygons are connected by traversing a vertex spanning tree that is defined by the table of vertex runs.

By converting the triangular mesh (e.g. a surface) into one or more triangulated polygons (and visa versa), information about the triangular mesh can be efficiently stored, compressed, transmitted, and decompressed.

The table of triangle runs describes one or more triangle spanning trees. Each triangle spanning tree is associated with one of the triangulated polygons. Each triangle spanning tree has triangle nodes and triangle edges. Each triangle node is associated with a polygon triangle. A plurality of these polygon triangles triangulate the polygon. This causes the polygon to have polygon vertices and a polygon boundary, where all the polygon vertices lie on the polygon boundary. Some of the edges of the polygon triangles, called boundary edges, lie on the polygon boundary, and connect two polygon vertices. The remaining edges of the polygon triangles, called internal edges, are each shared by two polygon triangles, and are internal to the polygon.

The marching record has additional information that describes how to construct the polygon triangles (therefore, the polygon vertices and the boundary edges) by traversing the triangle spanning tree. The marching record also has triangle root information that is used to identify which of the triangulated polygons is being traversed.

The table of vertex runs describes a vertex spanning tree. The vertex spanning tree has vertex tree nodes and vertex tree edges. The vertex spanning tree provides additional connectivity information to construct the triangular mesh from the polygons. While traversing the vertex spanning tree, pairs of boundary edges are identified as being a single edge of the triangular mesh. Therefore, traversing the vertex spanning tree establishes a one to one correspondence between the vertex tree nodes and the vertices of the triangular mesh.

Once the connectivity information of the triangular mesh is established, the information contained in the associated data record determines the positions of the vertices of the triangular mesh. The information contained in the optional additional data records determines the colors, normals, and texture coordinates of the triangular mesh.

The invention also includes a system and method for compressing a triangular mesh by representing it with this data structure, for decompressing a triangular mesh represented with this data structure, and for transmitting a compressed triangular mesh represented with this data structure between computers. The compressing and decompressing processes are capable of handling the jump edge connections between triangle runs.

BRIEF DESCRIPTION OF THE DRAWINGS

FIG. 1, comprising

FIG. 2, comprising

FIG. 4, comprising

FIG. 8, comprising

FIG. 10, comprising FIGS. 10A and 10B, is a flow chart that enters values in the table of triangle runs.

DETAILED DESCRIPTION OF THE INVENTION

Figure 1A:
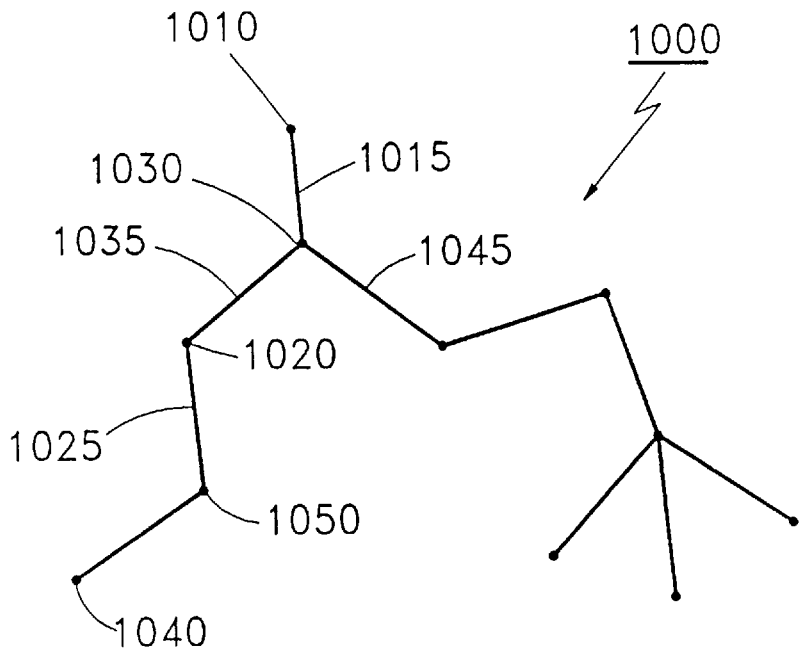
FIG. 1A and FIG. 1B, is a prior art example of trees.
Figure 1B:
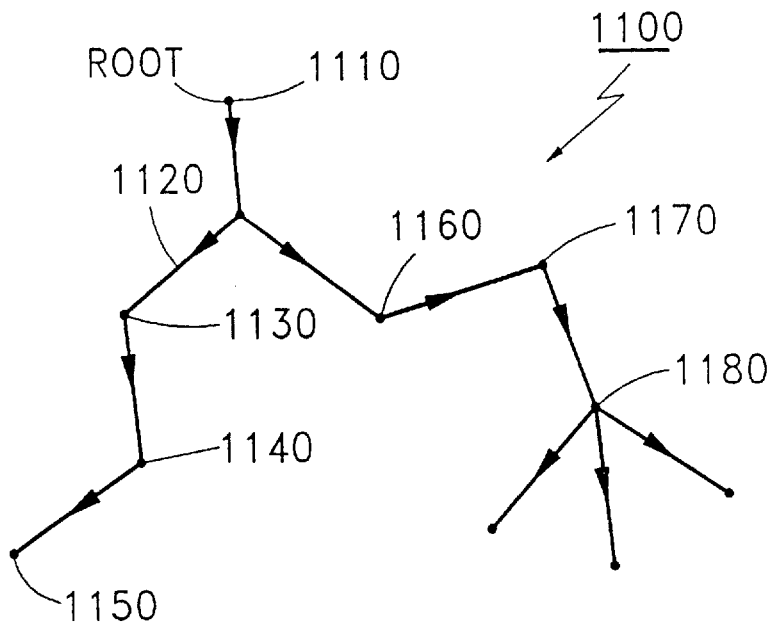
Figure 2A:
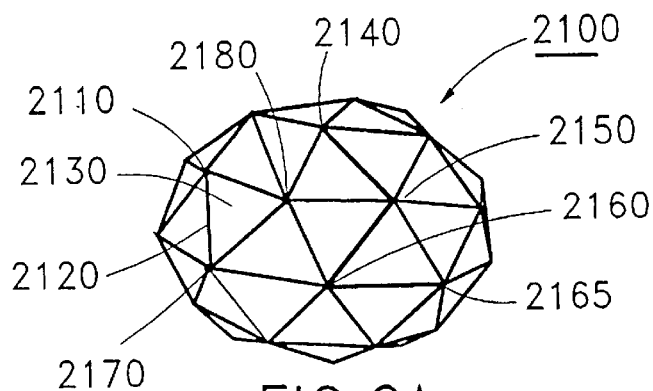
FIG. 2A, FIG. 2B, FIG. 2C, FIG. 2D, and FIG. 2E, is prior art example of triangular meshes.
Figure 2B:
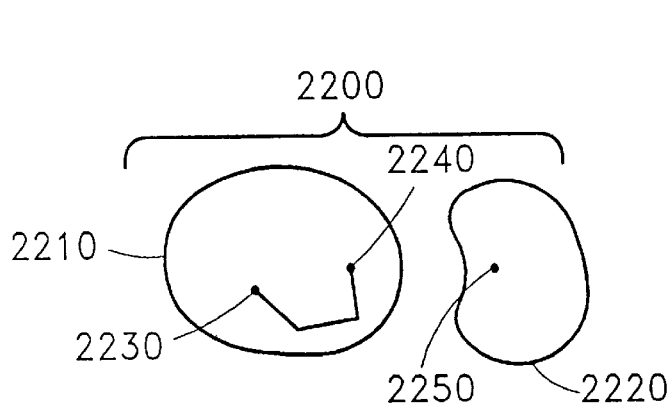
Figure 2C:
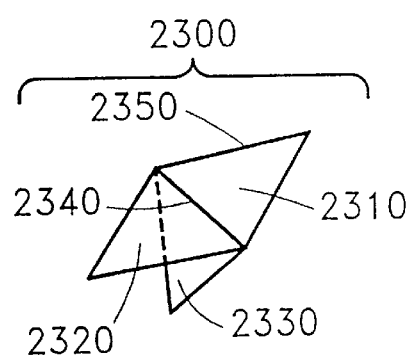
Figure 2D:
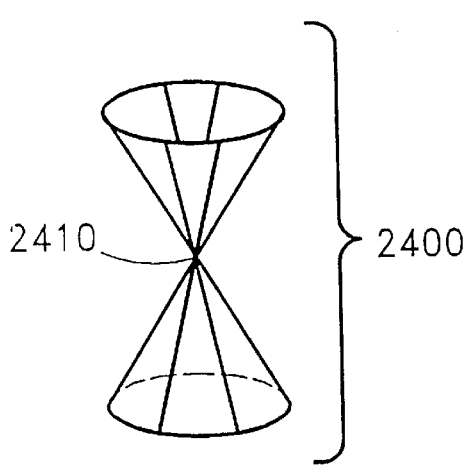
Figure 2E:
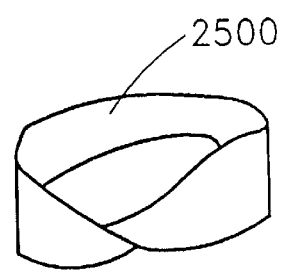
Figure 3:
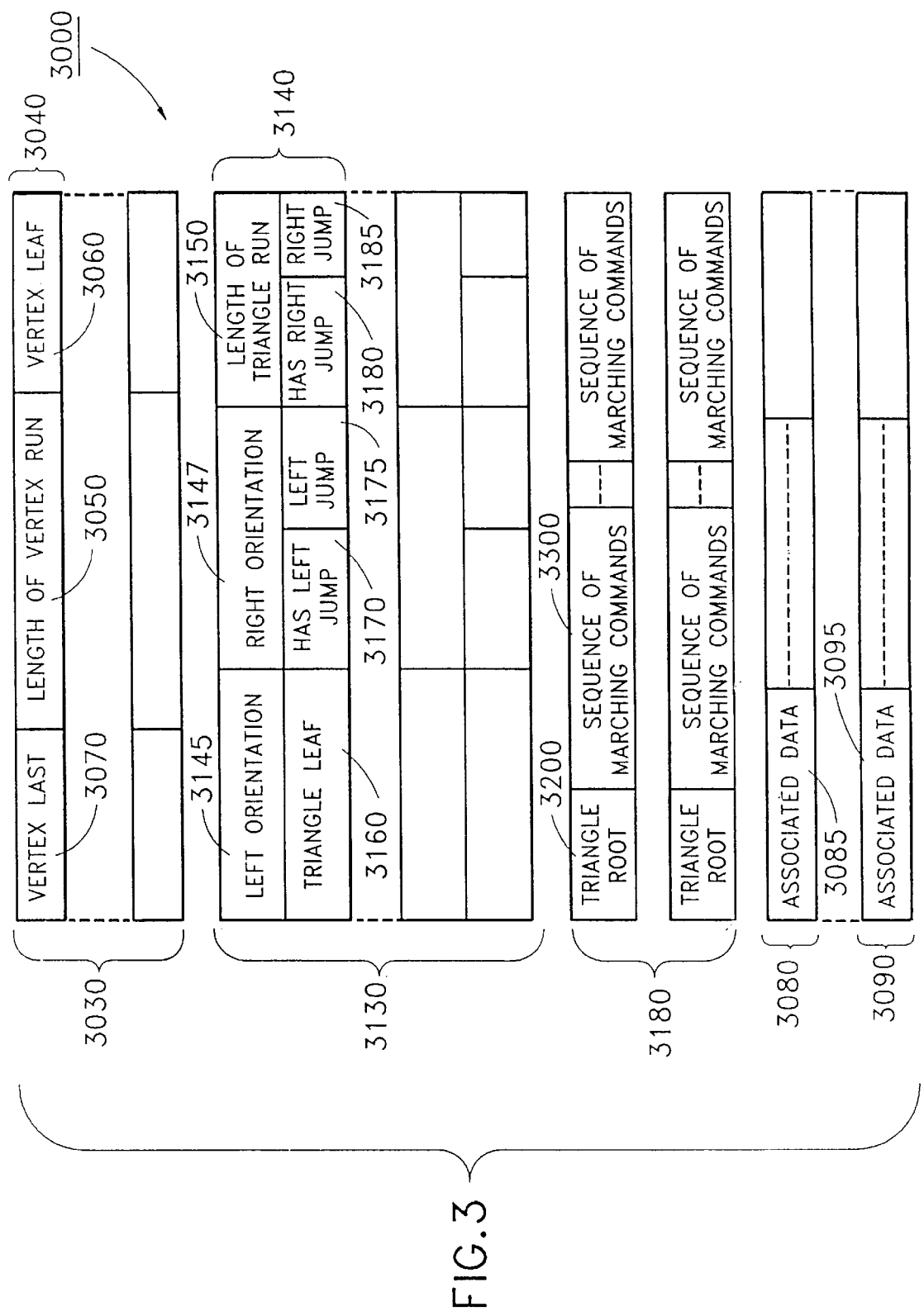
FIG. 3 is a block diagram of the data structure disclosed in this invention for representing any triangular mesh in n-dimensional space.
Figure 11:
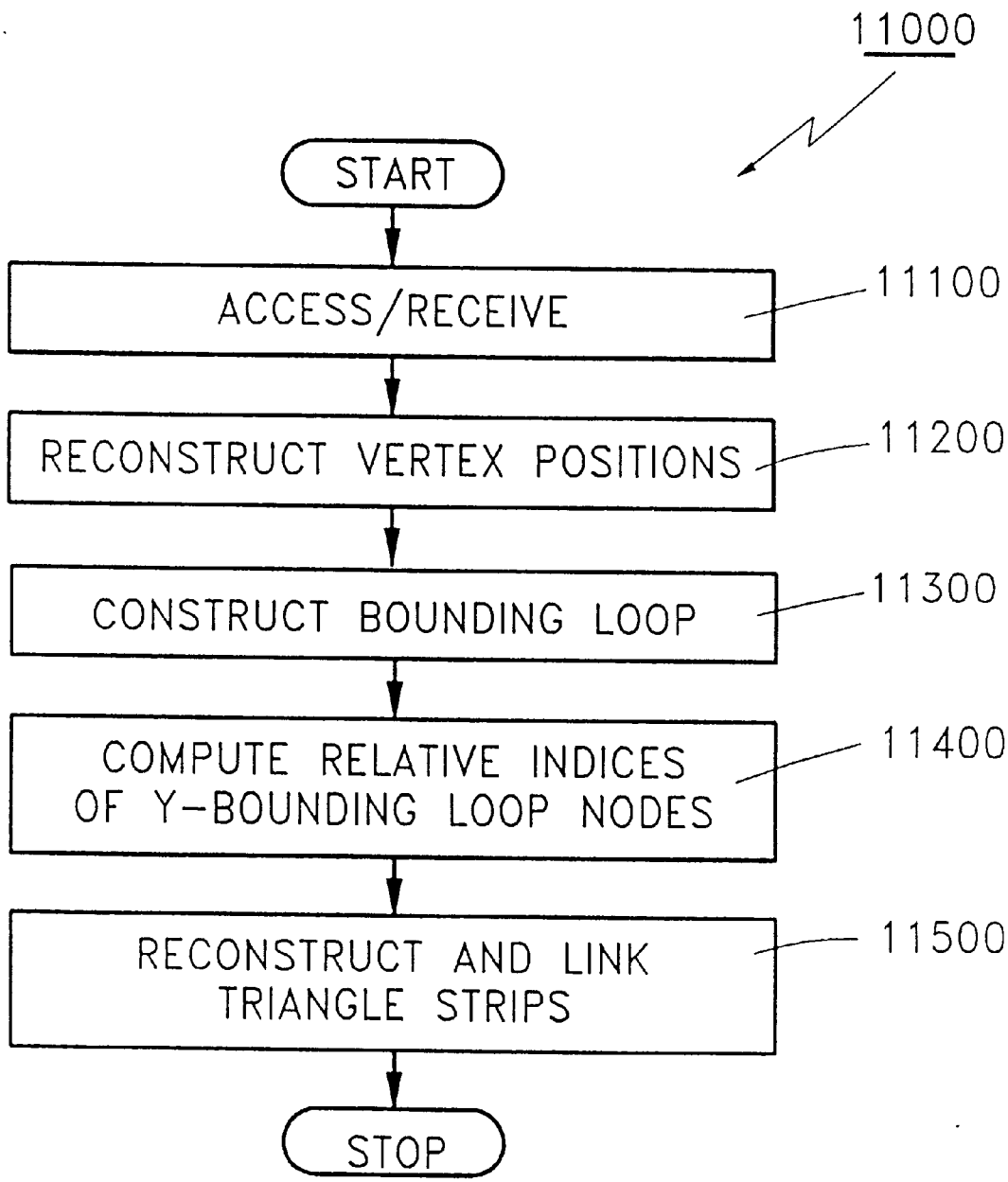
FIG. 11 is flow chart showing the steps of a preferred decompression process.

In computer graphics, geometric objects or models can be represented by surfaces that can further be represented by triangular meshes. In this description, examples of these meshes are shown in FIG. 2. In a compression process 6000 shown in FIG. 6, these meshes can be cut along edges in specific ways described in FIG. 4B to create a set of triangulated polygons (FIG. 4E) representation of the triangular mesh (geometric object, e.g. FIG. 4A). The triangulation of the polygons is defined by information given by a table of triangle runs and a marching record. (See FIG. 3.) Other information required to reconstruct the triangular mesh from the set of triangulated polygons is preserved in a table of vertex runs. This information is shown in FIG. 3 along with positional information about the vertices of the triangular mesh. A decompression process used to reconstruct the triangular mesh is shown in FIG. 11.

FIG. 3 is a block diagram of the data structure 3000 disclosed in this invention for representing a triangular mesh in n-dimensional space. The data structure comprises:

1) a vertex spanning tree described by a table of vertex runs 3030, the table of vertex runs having one or more vertex run records 3040, each vertex run record having a "vertex last" field 3070, a "length of vertex run" field 3050, and a "vertex leaf" field 3060.

2) one or more triangle spanning trees described by a table of triangle runs 3130, the table of triangle runs having one or more triangle run records 3140, each triangle run record having an optional "left orientation" field 3145, an optional "right orientation" field 3147, a "length of triangle run" field 3150, a "triangle leaf" field 3160, an optional "has left jump" field 3170, an optional "left jump" field 3175, an optional "has right jump" field 3180, and an optional "right jump" field 3185.

3) a marching record 3180 having one or more triangle root fields 3200 and one or more sequences of marching commands 3300, each triangle root field 3200 describing how to construct the triangle associated with a triangle root node of one of the triangle spanning trees, and each sequence of marching commands 3300 indicating how to construct triangles from one of the triangle runs of one of the triangle spanning trees by advancing to a next vertex along either: A. a left run boundary or B. a right run boundary of the triangle run.

4) an (optional) associated data records 3080 having one or more associated data fields 3085, each associated data field with information about the position of one vertex of the triangular mesh.

5) one or more (optional) additional data records 3090, each additional data record 3090 having one or more additional data fields 3095, each additional data field with information about one color, normal or texture coordinates vector of the triangular mesh.

FIG. 4, comprising FIG. 4A, FIG. 4B, FIG. 4C, FIG. 4D, FIG. 4E, and FIG. 4F, illustrates the relation between elements of the triangular mesh and components of the data structure 3000.

Figure 4A:
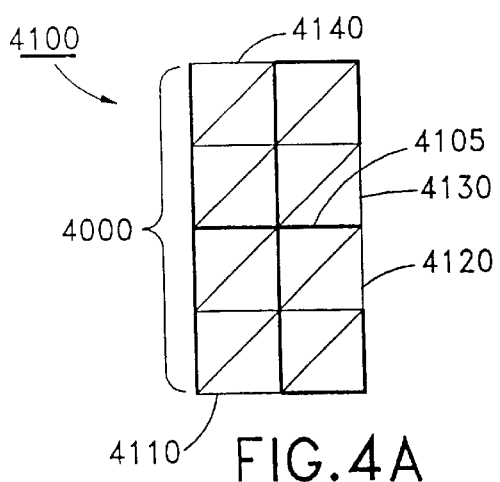
FIG. 4A, FIG. 4B, FIG. 4C, FIG. 4D, FIG. 4E, and FIG. 4F, illustrates cutting a general triangular mesh to define jump edges and to create a triangulated polygon.
Figure 4B:
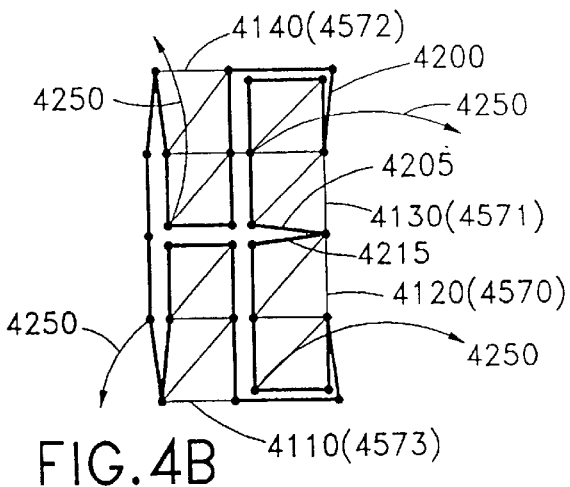
Figure 4C:
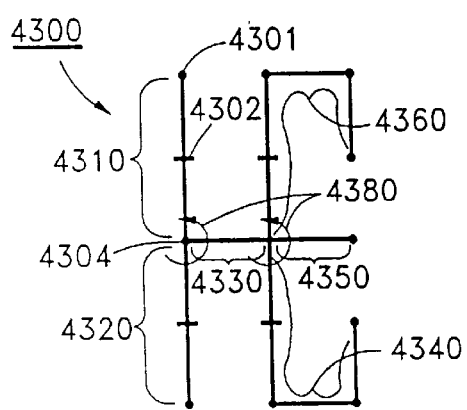
Figure 4D:
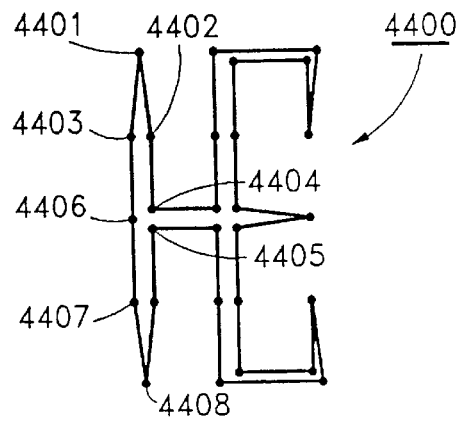
Figure 4E:
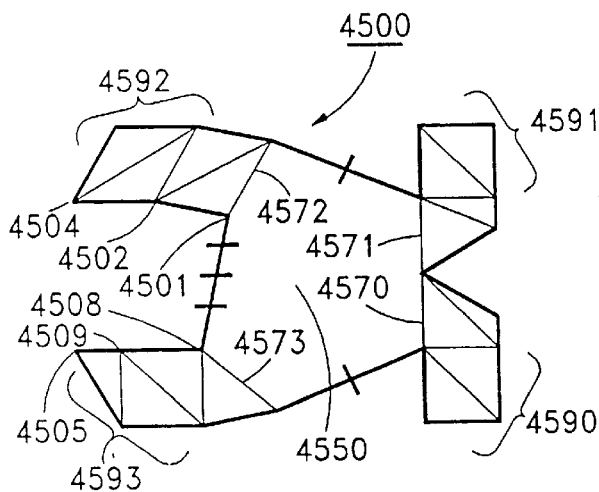
Figure 4F:
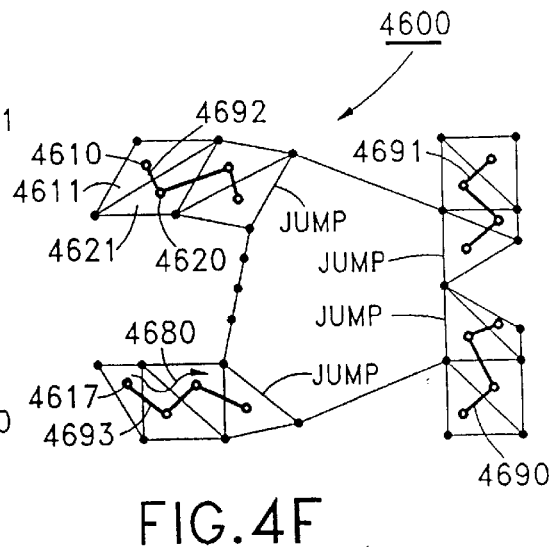

FIG. 4A is a triangular mesh 4000 (geometric model) with one or more edges 4105 chosen to create the vertex spanning tree 4100, also shown schematically in FIG. 4C. The triangular mesh is cut along the edges of the vertex spanning tree 4100 in FIG. 4B and the boundaries created by this cutting are shown in FIG. 4D. FIG. 4E shows the set of triangulated polygons 4500 created by "flattening" the triangular mesh, i.e. laying all the vertices and cut edges of the triangular mesh in one plane. FIG. 4F shows the triangle spanning trees (4690, 4691, 4692, and 4693) superimposed 4600 on the set of triangulated polygons 4500. Using FIG. 6, the compression process 6000 populates the data structure 3000 to represent the triangular mesh 4000 in a more compressed form.

Note that the triangular mesh 4000 is complex, i.e., when the edges of the vertex spanning tree 4105 are "cut" a single triangulated polygon does not result. In this case, when the "tabs" of the structure in FIG. 4B are rotated 4250 to create the structure 4500 in FIG. 4E, there can be a non triangulated "hole" 4550 created in the structure 4500. More importantly, there are one or more pairs of nodes on the boundary that are not connected by edges on the boundary but that are connected by edges internal to structure 4500. These edges (4570–4573) are called jumps. Note also that there can more than one triangulated polygon (4590–4593) created to describe complex triangular meshes. In some cases, i.e., when the triangular mesh in non manifold, two or more of these triangulated polygons can overlap. (Note that the structure 4500 is also referred to as the set of triangulated polygons, 4590–4593.)

In this invention, there is a triangle spanning tree (4690–4693) used to represent each of the triangulated polygons (4590–4593). The decompression process described in FIG. 11, traverses the triangle spanning trees (4690, 4691, 4692, and 4693) described by the table of triangle runs 3130. Traversing the triangle spanning trees and using information in the marching record 3180, uniquely defines the set of triangulated polygons 4590–4593. By traversing the vertex spanning tree (4300, FIG. 4C) described by the table of vertex runs 3030, the triangulated polygons 4590–4593 in the structure 4500 are "stitched together" to recreate the triangular mesh 4000 in FIG. 4A taking into account the jumps.

In the present invention the triangular mesh 4000 is represented in compressed form by a vertex spanning tree 4100, a rooted tree, on the graph defined by the vertices and edges of the triangular mesh. The vertex spanning tree and the set of vertices of the mesh, considered as a set of points in n-dimensional space, is represented in the data structure 3000 by the table of vertex runs 3030, and the associated data record 3080. Optionally, the additional data records 3090 may contain additional information about colors, normals, and texture coordinates.

If the mesh is cut through the vertex tree edges, the vertex spanning tree 4100 becomes a bounding loop having two or more bounding loop edges. FIG. 4B illustrates the formation of the bounding loop 4200 by artificially enlarging the topological discontinuity created by cutting the mesh through the vertex tree edges. After cutting, each vertex tree edge 4105 corresponds to two bounding loop edges 4205, 4215. The correspondence between vertex tree edges 4105 and bounding loop edges (4205, 4215) is implicitly described by the vertex spanning tree (4100, 4300). This correspondence will be used in the compression and decompression processes below and because the correspondence is implicit, information about the correspondence does not need to be maintained. In the present invention the vertex tree edges are also called cut edges 4105.

FIG. 4D shows a schematic representation 4400 of the bounding loop 4200. The bounding loop 4200 has one or more bounding loop nodes, e.g. 4401. (Note that the bounding loop (6200, 4400) is also partially the boundary of the triangulated polygons 4500.) Each node of the vertex spanning tree, e.g. 4301–4304, corresponds to one or more of the bounding loop nodes. For example, each vertex leaf node 4301 of the vertex spanning tree corresponds to one bounding loop node 4401. Each vertex regular node 4302 of the vertex spanning tree corresponds to two bounding loop nodes 4402, and 4403. Each vertex branching node 4304 of the vertex spanning tree corresponds to three or more bounding loop nodes 4404, 4405, and 4406.

The compression process 6000 defines an vertex order of traversal 4380 of the vertex spanning tree 4300 while the decompression process 11000 uses the vertex order of traversal 4380 of the vertex spanning tree 4300 to "stitch together" the set of triangulated polygon 4500. The vertex order of traversal 4380 defines in which order the compression 6000 and decompression 11000 processes traverse the vertex runs of the vertex spanning tree 4300. For example, a vertex order of traversal 4380 would be to traverse vertex runs 4310 first, 4320 second, 4330 third, 4340 forth, 4350 fifth, and 4360 sixth. In a preferred embodiment, the vertex order of traversal 4380 is represented in the order that the vertex runs 3040 are place by the compression process 6000 in the table of vertex runs 3030.

When the triangular mesh 4000 is cut through the cut edges, the result is a new triangular mesh with no internal vertices, which may or may not be a set of one or more triangulated polygons 4500. In general, it is necessary to cut further through one or more jump edges (4110, 4120, 4130, and 4140) to obtain the set of triangulated polygons 4500 (with no internal vertices).

FIGS. 4E shows the set of triangulated polygons 4500 enclosed by the bounding loop 4400 artificially flattened. Bounding loop nodes 4401, 4402, 4404, 4405, 4409, and 4408, respectively correspond to polygon vertices 4501, 4502, 4504, 4505, 4509, and 4508 of the set of triangulate polygons 4500. Note that although every polygon vertex corresponds to one bounding loop node, some bounding loop nodes may not correspond to any polygon vertex. For example, bounding loop nodes 4403, 4406, and 4407 do not correspond to any polygon vertex. Also note that some boundary edges (4570, 4571, 4572, and 4573) of the triangulated polygons do not correspond to bounding loop edges, but respectively correspond to jump edges 4120, 4130, 4140, and 4110. Each of the triangulated polygons (4590, 4591, 4592, and 4593) in the set 4500 can be described by one of the triangle spanning trees (4690, 4691, 4692, and 4693) shown in FIG. 4F. Each of the triangle spanning trees (4690, 4691, 4692, and 4693 is the dual graph of one of the triangulated polygons (4590, 4591, 4592, and 4593), with each node of the triangle spanning tree, called a triangle node (typically 4610, 4620, etc.), associated with one polygon triangle, e.g. 4611, 4621, respectively, of one of the triangulated polygons of the set 4500.

The triangle spanning trees (4690, 4691, 4692, and 4693) are represented in the data structure 3000 by the table of triangle runs 3130. The order of the triangle run records in the table of triangle runs is determined by a triangle order of traversal 4680 of each triangle spanning with respect to the corresponding triangle root node, e.g. 4617. (A triangle root node 4617 is the root node of the triangle spanning tree 4693 which is a rooted tree.)

Each triangle run record 3140 represents a run of one of the triangle spanning trees and can be composed of variable number of fields. The length of triangle run field 3150 and the triangle leaf field 3160 are always required. If a complex mesh is being represented, at least one of the triangle run records 3140 will contain jump information, e.g. fields 3175, 3185. If a complex mesh has a non orientable surface, orientation information, e.g., fields 3145, 3147 is used.

One preferred embodiment of the data structure 3000 is shown in FIG. 3. Here an optional "left orientation field" 3145, and optional "right orientation" field 3147, a length of run field 3150, a leaf field 3160, an optional "has left jump" field 3170, an optional "left jump" field 3175, an optional "has right jump" field 3180, and an optional "right jump" field 3185 is used.

The structure of the triangle spanning trees 4690 described in the table of triangle runs 3130 does not uniquely specify how to triangulate the set of triangulated polygons 4500 by connecting the bounding loop nodes, e.g. 4401–4404, of the bounding loop 4400. There are many different triangulated polygons 4500 with the same dual graphs, i.e. the triangle spanning trees 4690. Furthermore, the jump edges, and nonorientable meshes, such as the one shown in FIG. 2E, require extra information to be encoded in the data structure 6000. Therefore, the optional fields 3145, 3147, 3170, 3175, 3180, and 3185 of the triangle run records 3140, and the information contained in the marching record 3180 is needed to complete the description of how the triangulated polygons 4500 are actually triangulated.

The triangle root node 4610 of one of the triangle trees 4692 is represented in one of the triangle root fields 3200 of the marching record 3180 and the marching commands 3300 are also represented in the marching record 3180.

In a preferred implementation, the triangle root node 4610 is a triangle leaf node of the triangle spanning tree 4692 which is identified by the second bounding loop node 4504 of the three consecutive bounding loop nodes (4514, 4504, and 4524) connected by the corresponding triangle 4611. By traversing the triangle spanning trees 4690 according to the triangle order of traversal 4680 as defined by the order of the records 3140 in the table of triangle runs 3130, the decompression process 11000 fills the bounding loop 4400 with polygon triangles, typically 4611, to reconstruct the triangulated polygons 4500.

Figure 5:
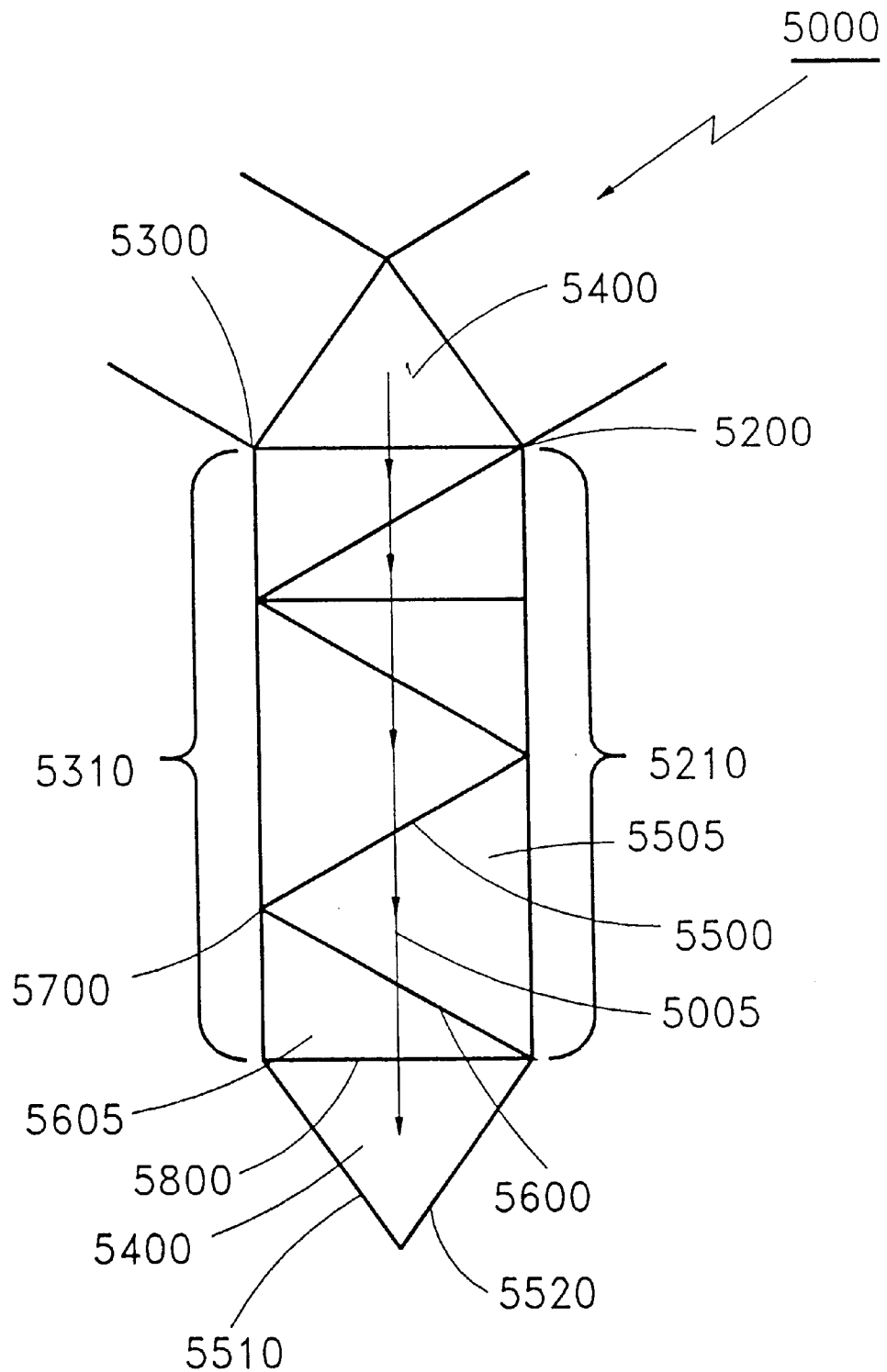
FIG. 5, illustrates the construction of the marching record.

FIG. 5 illustrates how the compression process 6000 constructs the marching commands in each of the sequences of marching commands 3300 and determines the values of the optional fields 3145, 3147, 3170, 3175, 3180, and 3185 associated with a triangle run record 3140. An example triangle run 5000, shown in FIG. 5, illustrates how a portion of the bounding loop 4400 has comprise a left run boundary 5210 and a right run boundary 5310 as determined with respect to the direction of traversal of the run 5005. As the triangle run 6000 is traversed 5005, marching edges, e.g. 5600, are crossed in an order, determined by the triangle order of traversal 4680. A marching edge is an internal edge of one of the triangulated polygons 4500. Each marching edge 5600 shares a vertex with the previous marching edge 5500 in the triangle run. Each shared vertex 5700 lies either on the left run boundary 5210 or on the right run boundary 5310. The compression process 6000 assigns a value in the marching record 3180 to identify whether the shared vertex 5700 lies on the left or right run boundary. As the triangle run is traversed 5005 each of the marching edges 5600 in the triangle run is identified by one of these values and the sequence of these values is the sequence of the marching commands 3300 associated with the respective triangle run 6000. For example, as the triangle run 6000 is traversed 5005, the marching edges 5500, 5600, and 5800 are crossed. Upon crossing marching edge 5500, a value of "0" is given to indicate that the triangle 5505 is constructed by advancing on the left run boundary 5210. In other words, one of the sides of triangle 5505 is on the left run boundary 5210. Upon crossing the marching edge 5600, a value of "1" is given to indicate that the triangle 5605 is constructed by advancing on the right run boundary 5310. In other words, one of the sides of triangle 5605 is on the right run boundary 5310. Note that when the last marching edge 5800 is crossed no value needs to be assigned. (See below.)

As the triangle run is traversed 5005 the left vertex 5200 can advance on the left boundary run boundary 5210 in one of two possible orientations along the bounding loop. Similarly, the right vertex 5300 can advance on the right boundary run boundary 5310 in one of two possible orientations along the bounding loop. In one preferred implementation, the compression process 6000 determines the values of the "left orientation" field 3145 and the "right orientation" field 3147 while traversing the triangle run, and the decompression process uses these values to reconstruct the triangles. In other preferred implementation the "left orientation" field 3145 and the "right orientation" field 3147 are not used as part of the triangle run record 3140 because both left and right vertices advance always in the same orientation along the bounding loop.

Either one, or both, of the two edges 5510, 5520 of the last triangle of a triangle run that are not shared with the previous triangle of the triangle, may be a jump edge, e.g. 4110. When this is the case, jump information is included in the data structure 3000. In one preferred embodiment, this jump information is included in the fields "has left jump" 3170 and "has right jump" 3180 are part of the triangle run record 3140 and determine if the fields "left jump" 3175 and "right jump" 3185 in the triangle run record 3140. In this embodiment, the "has right (left) jump" field is typically one bit to indicated if there is a "right (left) jump" value. Alternatively, when triangular meshes that can be represented without jumps, the fields 3170, 3175, 3180, and 3185 need not be part of the triangle run record 3140.

Figure 6:
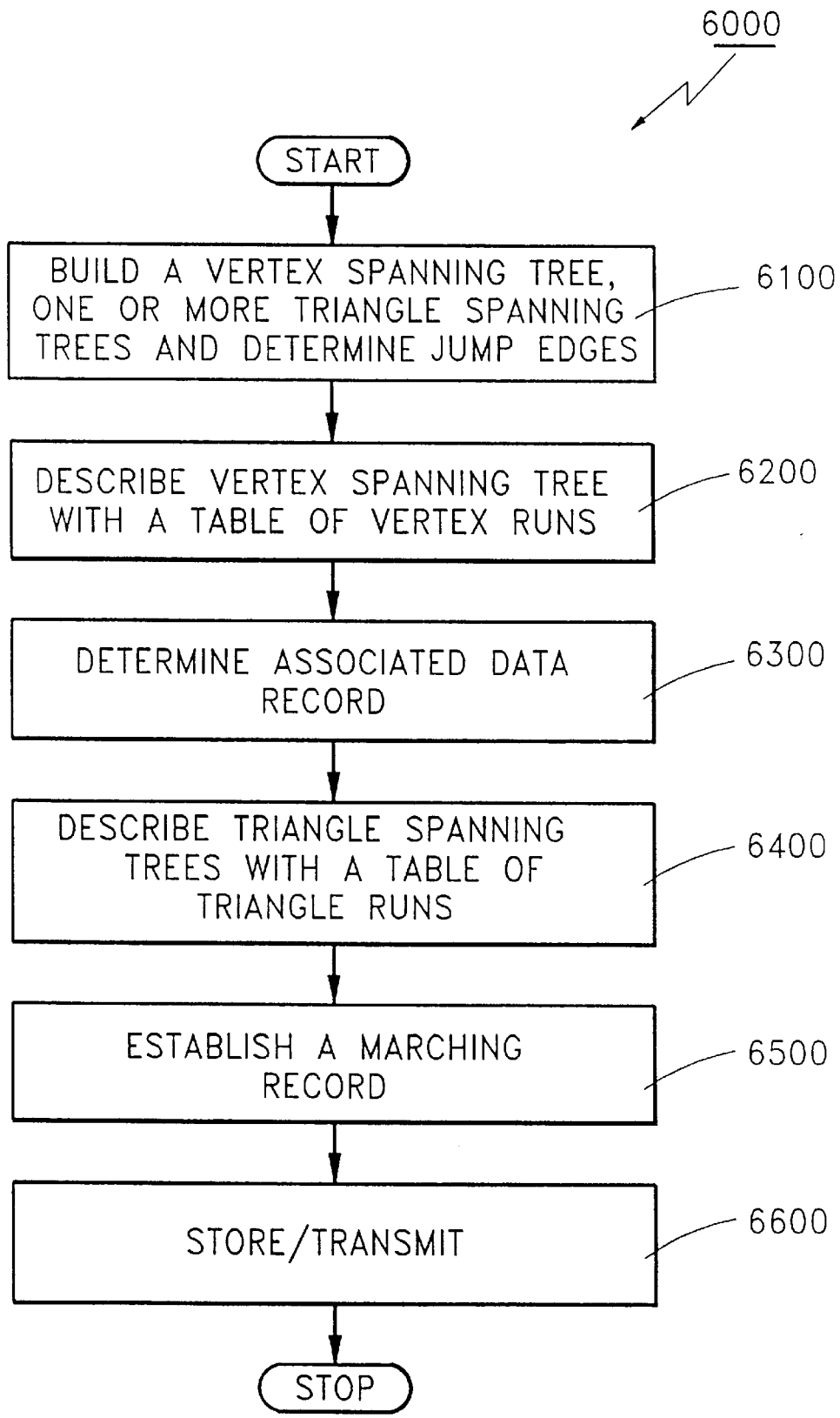
FIG. 6 is a flow chart of a method for compressing the triangular mesh.

FIG. 6 is a flow chart of a method 6000 for compressing a triangular mesh. As described above, compressing a triangular mesh comprises the following steps: building the vertex spanning tree, the triangle spanning trees 6100, and determining the jump edges in the graph of vertices and edges of the triangular mesh; describing the vertex spanning tree with a table of vertex runs 6200; describing the positions of the vertices of the triangular mesh with an associated data record 6300; describing the triangle spanning trees with a table of triangle runs; and establishing the marching record 6400. Once these data structures are defined by the compression process 6000, the data structures can be stored 6600 in a memory and/or transmitted 6600 over a communication link, e.g. a network (internet).

In step 6100, a vertex spanning tree and one or more triangle spanning trees are created. This is done by determining which edges 2120 of the triangular mesh 4000 are cut edges 4105 (i.e., that belong to the vertex spanning tree 4100), which edges 2120 of the triangular mesh 4000 are marching edges 5600 (i.e., that belong to one of the triangle spanning trees), and which edges are jump edges, e.g. 4110. This step can be performed in several ways. See FIGS. 7–8 below.

Steps 6200, 6300, 6400, and 6500, populate the data structure 3000 in order to represent the triangular mesh in compressed form.

Step 6200 defines the vertex spanning tree 4100 in the data structure 6000 by creating records 3040 in the table of vertex runs 3030. This is further described in FIG. 9 below.

Step 6300 determines the corrective terms corresponding to all the vertices of the triangular mesh. This step is optionally performed. Step 6300 uses the order of traversal that is determined in step 6200 to identify the ancestors of each given vertex. The corrective terms are then determined for each given vertex as described above and placed in records 3060 of the data structure 3000. Note that in this step 6300, data representing colors, normals, texture coordinates, and other information is placed in the additional data records 3090.

Step 6400 defines the triangle spanning trees 4690 in the data structure 3000 by creating records 3140 in the table of triangle runs 5130. This is further described in FIG. 10 below.

Step 6500 establishes the marching record 3160 in the data structure 6000. This is described in FIG. 5 above.

Step 6600 stores the data structure 3000 in a memory and/or transmits the information in the data structure 3000 over a communication link. This information can be further compressed and/or encrypted by known techniques.

Figure 7:
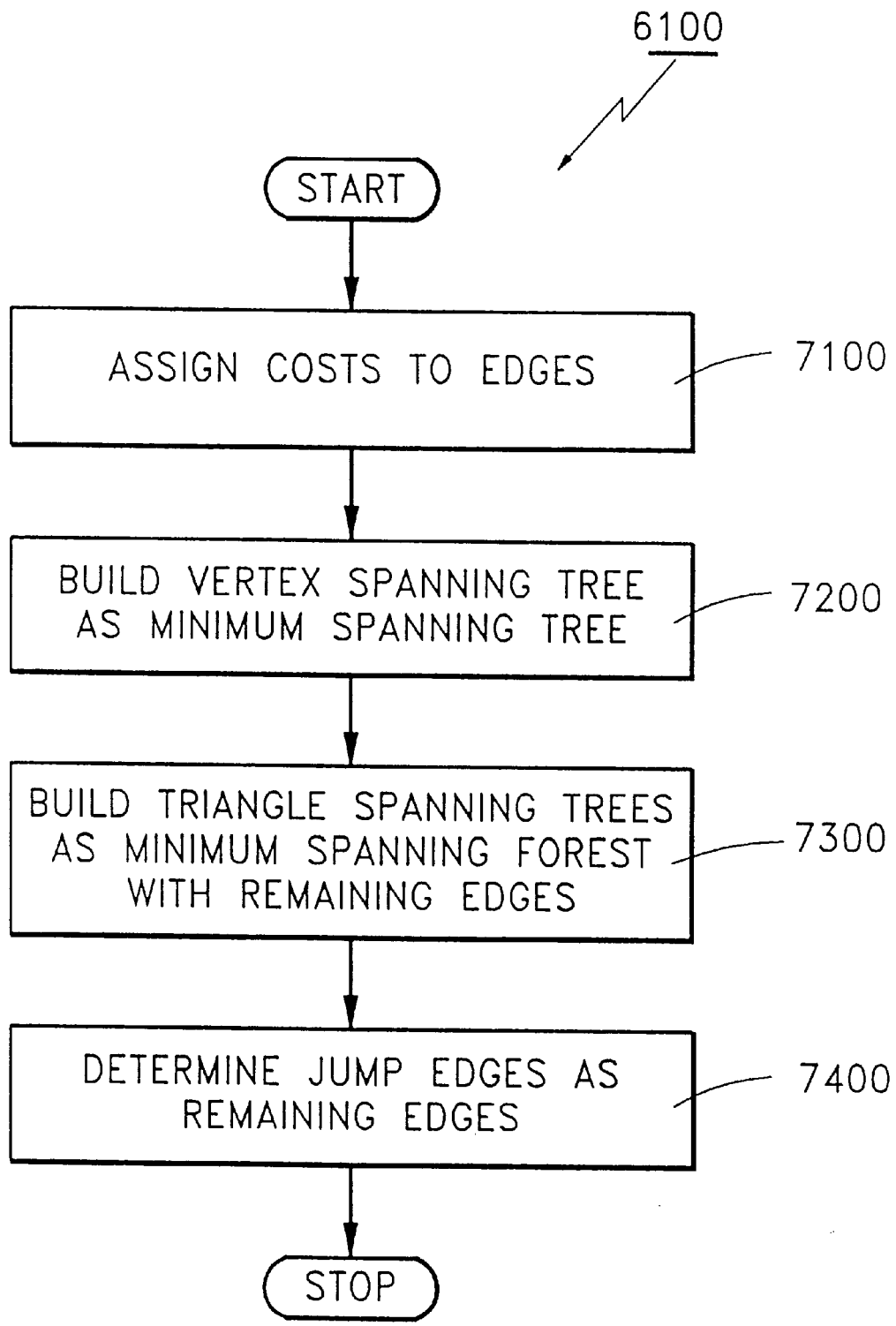
FIG. 7 is a flow chart showing the steps performed in one preferred embodiment that creates a vertex spanning tree and a triangle spanning tree.

FIG. 7 is a flow chart showing the steps performed in one preferred embodiment that creates a vertex spanning tree and a triangle spanning tree. In step 7100 a cost is assigned to each edge of the triangular mesh. In step 7200, the vertex spanning tree is constructed as the spanning tree of minimum total cost using a minimum spanning tree construction algorithm. Many such algorithms are known in the prior art. The edges are first ordered by increasing cost. In step 7300, the triangle spanning trees are constructed using all the edges not used by the vertex spanning tree as the spanning tree of minimum total cost using a minimum spanning tree construction algorithm. The remaining edges, i.e., those that neither belong to the vertex spanning tree nor to any one of the triangle spanning trees are the jump edges 7400.

In a more preferred embodiment in step 7100, the cost assigned to each edge of the mesh is the length of the edge. In another more preferred embodiment the cost assigned to each edge of the mesh is the Euclidean distance from the edge midpoint to the vertex associated with the vertex root node of the vertex spanning tree. In this way edges closer to the vertex spanning tree root are considered before those that are far away, and both trees grow away from the vertex spanning tree root eventually covering the whole mesh.

Figure 8A:
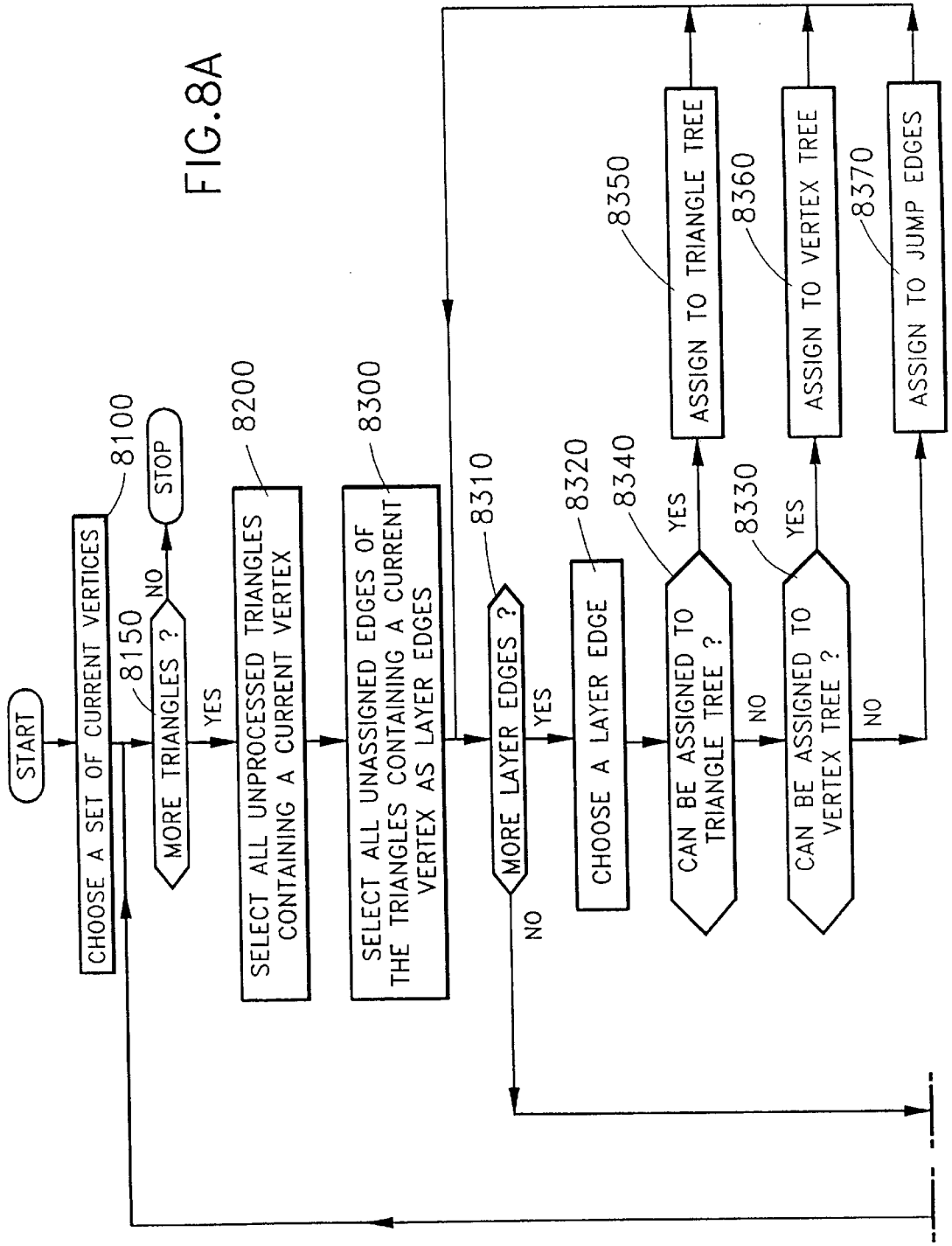
FIGS. 8A and 8B, is a flow chart showing the steps performed by an alternative preferred embodiment that creates a vertex spanning tree and a triangle spanning tree.
Figure 8B:
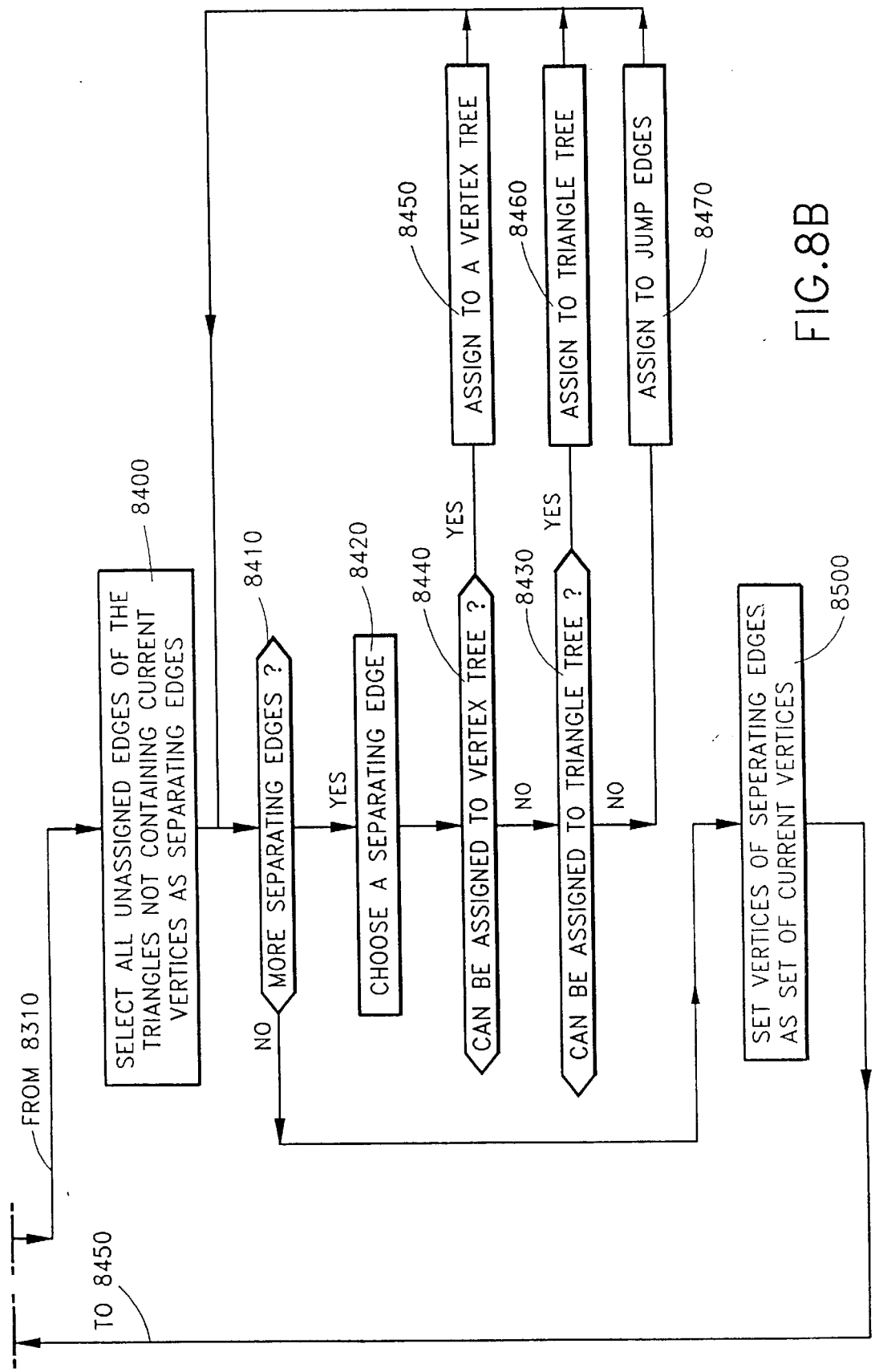

FIG. 8 is a flow chart showing the steps performed by an alternative preferred embodiment of step 6100 that creates a vertex spanning tree, one or more triangle spanning trees, and determines the jump edges. In this embodiment of 6100, the triangular mesh is decomposed into a layer sequence of triangulated layers and then both the vertex spanning tree and the triangle spanning tree are incrementally constructed by visiting each of these layers in this layer sequence.

Initially, both the vertex spanning tree 4100 and the triangle spanning trees 4690 contain no edges. In step 8100 a set of current vertices is chosen. In a preferred embodiment, the set of current vertices has only one vertex. Step 8150 checks to see if all of the triangles in the triangular mesh have been visited. If they have, the process 6100 stops. If not, step 8200 selects all unprocessed (unvisited) triangles containing one or more of the vertices in the set of current vertices chosen before. The set of selected 8200 triangles is called the current triangulated layer. In step 8300, all edges that have not been assigned (see below) and that contain at least one of the vertices in the set of current vertices are selected as a set of layer edges.

Steps 8310, 8320, 8330, 8340, 8350, 8360, and 8370 are the steps that assign layer edges either to the triangle spanning trees 4690, to the vertex spanning tree 4100, or to a set of jump edges. Step 8310 first determines if there are any remaining layer edges to be processed. If not, the process 6100 continues at step 8400. If there are remaining layer edges, a given one is chosen (step 8320) and step 8340 determines if the chosen layer edge can be assigned to the triangle spanning trees. The layer edge can be assigned to the triangle spanning trees only if it does not create a loop in the triangle spanning trees. This is determined by using well known techniques. In step 8350, the layer edge is assigned to the triangle spanning tree if it creates no loops in the triangle spanning trees. If the layer edge can not be assigned to the triangle spanning trees, step 8330 determines if the chosen layer edge can be assigned to the vertex spanning tree. The layer edge can be assigned to the vertex spanning tree only if it does not create a loop in the vertex spanning tree. This is determined by using well known techniques. In step 8360, the layer edge is assigned to the vertex spanning tree if it creates no loops in the vertex spanning tree. If the layer edge cannot be assigned to the vertex tree either, in step 8370 it is classified as a jump edge.

The remaining steps of this process 6100 assign the remaining unassigned edges of the triangles in the triangulated layer. These edges are called separating edges because they separate the current triangulated layer from the next triangulated layer in the sequence of triangulated layers. Step 8400 selects these separating edges.

Steps 8410, 8420, 8430, 8440, 8450, 8460, and 8470 are the steps that assign separating edges either to the vertex spanning tree 4100, to the triangle spanning tree 4690, or to the set of jump edges. Step 8410 first determines if there are any remaining separating edges to be processed. If not, the process 6100 continues at step 8500. If there are remaining separating edges, a given one is chosen (step 8420) and step 8440 determines if the chosen separating edge can be assigned to the vertex spanning tree. In step 8450, the separating edge is assigned to the vertex spanning tree if it creates no loops in the vertex spanning tree. If the separating edge does create a loop in the vertex spanning tree, step 8430 determines if the chosen separating edge can be assigned to the triangle spanning trees. In step 8460, the separating edge is assigned to the triangle spanning trees if it creates no loops in the triangle spanning trees. If the edge cannot be assigned to the triangle trees either, in step 8470 it is classified as a jump edge.

Step 8500 sets the set of vertices contained in the separating edges as the set of current vertices and the process 6100 continues at step 8150.

Figure 9:
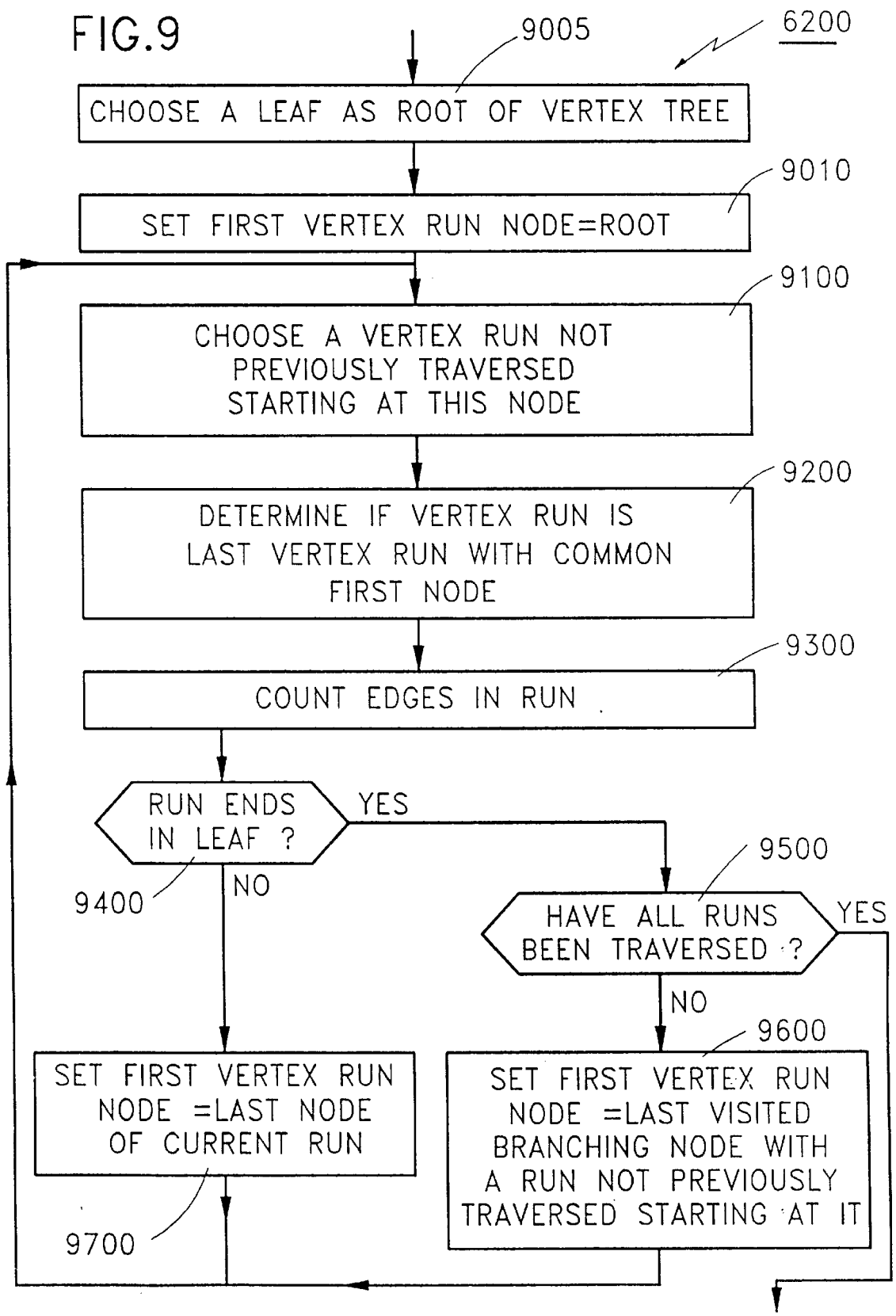
FIG. 9 is a flow chart that enters values in the table of vertex runs

Process 6200, shown in FIG. 9, creates records 3040 in the table of vertex runs. In step 9005, the process 6200 arbitrarily chooses one of the vertex leaf nodes 4301 as a vertex root node. The chosen vertex leaf node is set 9010 to a first run node. (Note that a vertex leaf node 4301 is defined above.) This defines the first node of a vertex run.

Step 9100 chooses a run that was not previously traversed starting at the first run node. (Note that when starting at the vertex leaf node 6301, there is only one run that can be traversed). Further, the run is chosen in the vertex order of traversal 4380. The orientation of the triangular mesh 4000 determines a direction of rotation (clockwise or counter clockwise) around any node and, in particular, around the first run node. In one preferred embodiment, the vertex order of traversal 4380 around the first run node is determined by starting at the edge entering the first run node and taking the runs leaving the first run node in clockwise order. Alternatively, the runs can be taken in counter clockwise order. However, note that the same vertex order of traversal 4380 has to be used for every first run node in the triangulated mesh.

Step 9200 determines if the current run being processed is the last run to be processed of those runs that have the first run node in common. The result of this test determines the value places in "vertex last" field 3070 of the vertex run record 3040 of the table of vertex runs 3030. Step 9300 counts the edges in the run chosen in step 9100 and places this value in "length of vertex run" field 3050 of data structure 3000.

Step 9400 determines if the run ends in a leaf. The result of this test determines the value places in "vertex leaf" field 3060 of the vertex run record 3040 of the table of vertex runs 3030. If the run does not end in a leaf (i.e., it ends in a branch), the first run node is set to the last node of the current run (a branching node) and the process 6200 returns to step 9100.

If the run ends in a leaf 9400, the process 6200 determines if all the runs of the triangular mesh have been traversed by the process 6200, step 9500. If all the runs have been traversed, the process 6200 ends. If not, step 9600 is performed.

Step 9600 sets the first run node to the last visited branching node prior to (a parent of) the chosen leaf node that has untraversed runs and then begins the process again at step 9100. Thus, process 6200 starts at a vertex leaf node continues up the vertex spanning tree until all the runs of the vertex spanning tree have been identified and assigned with the values in the vertex run record 3040 in the data structure 3000.

Figure 10A:
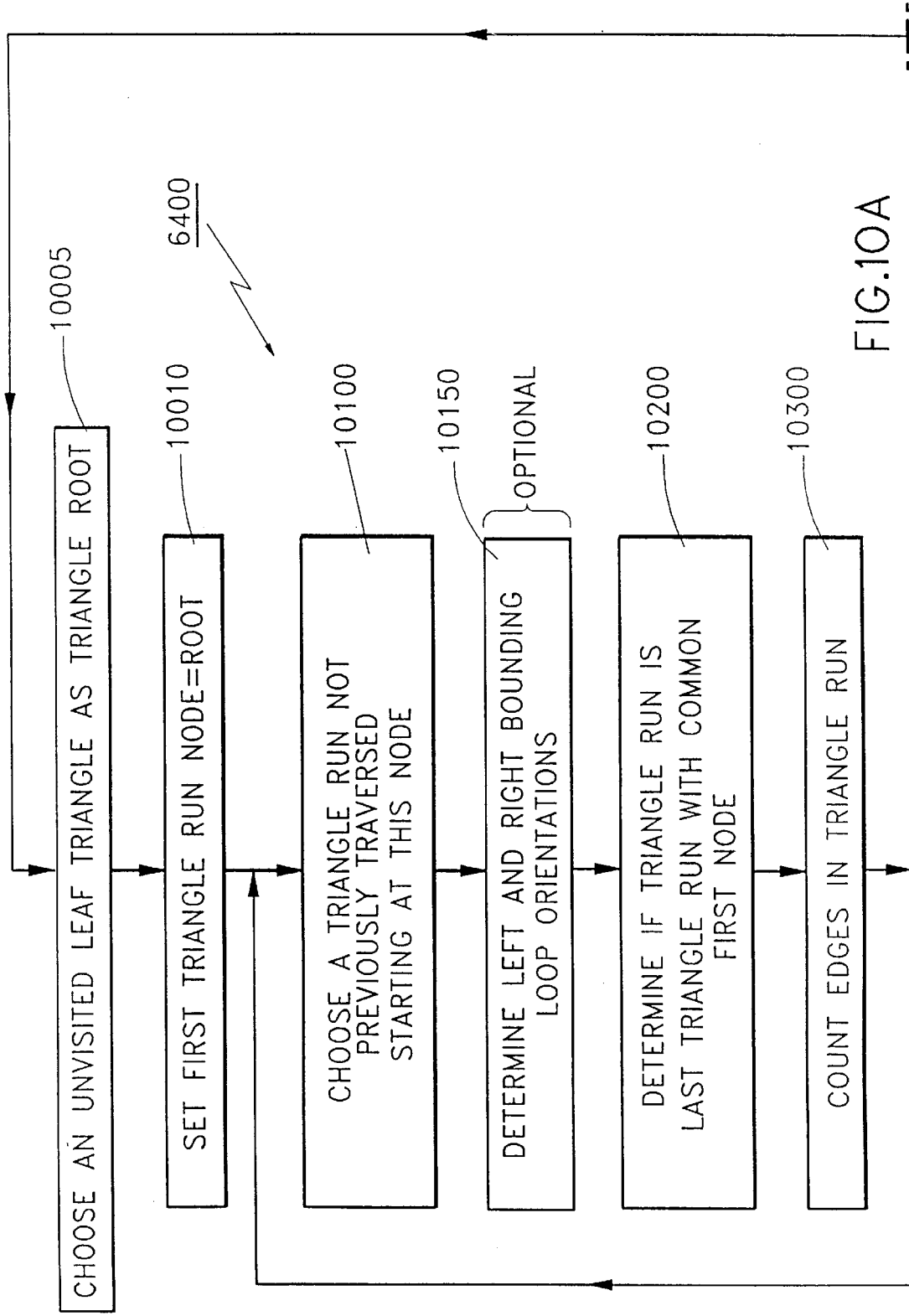

Process 6400, shown in FIG. 10, creates records 3140 in the table of triangle runs. In step 10005, the process 6400 arbitrarily chooses one of the triangle leaf nodes 4610 as a triangle root node. The chosen triangle leaf node is set 10010 to a first triangle run node. (Note that a triangle leaf node 4610 is defined above.) This defines the first node of a triangle run.

Step 10100 chooses a run that was not previously traversed starting at the first triangle run node. (Note that when starting at the triangle leaf node 4610, there is only one run that can be traversed). Further, the run is chosen in the triangle order of traversal 4680.

Step 10150 optionally determines if the left and right vertices of the marching edge move forward or backward along the bounding loop while traversing the run, and places the values in the "left orientation" 3145 and "right orientation" 3147 fields of the triangle run record 3140 corresponding to the current triangle run.

Step 10200 determines if the current triangle run being processed is the last triangle run to be processed of those runs that have the first triangle run node in common. Step 10300 counts the marching edges 5600 in the triangle run chosen in step 10100 and places this value in "length of triangle run" field 3150 of data structure 3000.

Step 10400 determines if the triangle run ends in a leaf. The result of this test determines the value places in "triangle leaf" field 3160 of the triangle run record 3140 of the table of triangle runs 3130. If the triangle run does not end in a leaf (i.e., it ends in a branch), the first triangle run node is set to the last triangle node of the current run (a branching node) and the process 6400 returns to step 10100. Note that regular nodes of the triangle tree associated with triangles with one jump edge must be considered as branching triangles with a branch of length zero.

If the run ends in a leaf 10400, the process 6400 determines if all the runs of the triangular mesh have been traversed by the process 6400, step 10500. If not, step 10700 is performed. If all the runs of the current triangle tree have been traversed, step 10550 determines if all the triangle trees have traversed. If not all the runs of the current triangle tree have been traversed, step 10600 is performed. If all the triangle trees have been traversed, process 6400 stops. If not, process 6400 returns to step 10005 to start processing another triangle tree.

Step 10600 sets the first run node to the last visited branching node prior to (a parent of) the chosen leaf node that has untraversed runs and then continues at step 10800. Thus, process 6400 starts at a triangle leaf node continues up the triangle spanning tree until all the runs of the triangle spanning tree have been identified and assigned with the values in the triangle run record 3140 in the data structure 3000.

Step 10700 sets the first run node to the last node of the current triangle run and then continues at step 10800.

Steps 10800, 10850, 10900, and 10950 are optional.

Step 10800 determines if the last node of the current run has a left jump. If the last node of the current run has a left jump, step 10850 determines the value of the jump as the distance along the bounding loop from the left vertex of the last marching edge of the run. If the distance and assigns values to the field "has left jump" 3170 and optionally to the field "left jump" 3175. The process then continues at step 10900.

Step 10900 determines if the last node of the current run has a right jump. If the last node of the current run has a right jump, step 10950 determines the value of the jump as the distance along the bounding loop from the right vertex of the last marching edge of the run, and assigns values to the field "has right jump" 3180 and optionally to the field "right jump" 3185. The process then continues at step 10100.

FIG. 11 is flow chart showing the steps of a preferred decompression process 11000.

Decompressing 11000 a triangular mesh involves the following steps: accessing and/or receiving 11100 the data structure 3000; reconstructing 11200 the table of vertex positions; constructing 11300 a look-up table that establishes a correspondence between bounding loop nodes and vertex spanning tree nodes; computing the relative indices 11400 for Y bounding loop nodes in the order in which they will be used; and reconstructing and linking 11500 of triangle strips.

Additionally, if the compressed representation has additional data records 3090 describing colors, normals, or texture coordinates, tables of colors, normals, or texture coordinate vectors are constructed similarly to how the table of vertex positions is constructed.

In step 11100, the data structure 3000 is accessed from a memory and/or received over a communication link. The information in this data structure 3000 can be compressed further and/or encrypted as described above.

Step 11200 constructs a vertex positions array from the structure of the vertex spanning tree information contained in the table of vertex runs 3030, and the associated data record record 3080 while visiting the nodes of the vertex spanning tree according to the vertex order of traversal 4380. In a preferred embodiment, while the vertex nodes are visited during the tree traversal an array of indices to ancestors of vertices is maintained, and the positions of the vertices are computed by adding a corrective term to a predicted position of the vertex.

Step 11300 constructs a look-up table establishes a correspondence between bounding loop nodes and vertex spanning tree nodes. As an example, bounding loop node 4401 (see FIG. 4) is associated with vertex spanning tree node 4301 as bounding loop nodes 4402 and 4403 both are associated with vertex spanning tree node 4302. Therefore, while the vertex spanning tree 4300 is traversed in step 11200, the bounding loop node information for each of the vertex spanning tree nodes is determined and entered into the look-up table.

The bounding loop is constructed during the recursive traversal of the vertex spanning tree and represented by the look-up table. References to vertices encountered going down the tree are added to the table during the traversal. Except for leaf vertices, these references are also pushed onto a stack. The last and leaf fields of each vertex run which describe how the vertex runs are connected forming the vertex spanning tree are used to control the tree traversal and the stack popping.

Step 11400 computes the relative indices for Y bounding loop nodes in the order of triangle spanning tree traversal 4680. This step determines how to create a triangle at a branching node of the triangle spanning tree by finding the third vertex of the triangle on the bounding loop node. Note that the "left" and "right" vertices are already determined. See FIG. 12.

Figure 12:
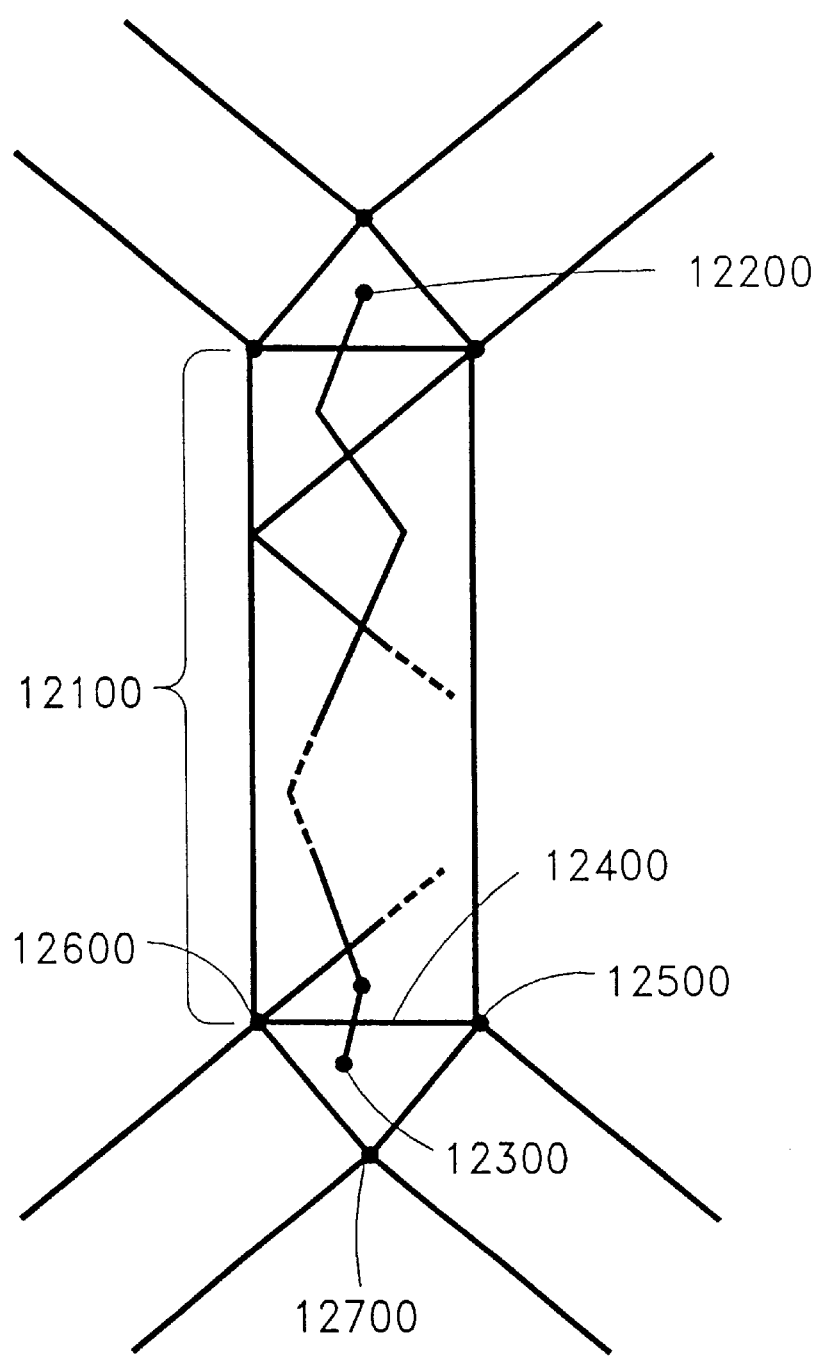
FIG. 12 is a drawing illustrating Y bounding loop nodes, i.e., how to create a triangle at a branching point in a triangle tree.

FIG. 12 illustrates the Y bounding loop nodes. A triangle run 12100 has a first node 12200 and a last node 12300. A last marching edge 12400 of the triangle run connects a last triangle associated with the last node 12300 to a previous triangle in the triangle run. The last marching edge 12400 also connects a last left bounding loop node 12500 to a last right bounding loop node 12600. The last triangle connects the last left and right bounding loop nodes to a third bounding node 12700, which we call Y bounding loop node. In order to construct the last triangle the third bounding node 12700 must be determined in a preprocessing step for every one of the last triangles, i.e., the triangles at the branching nodes. This information is implicitly contained in the table of triangle runs 3130. Therefore, before starting to construct the triangles in the triangle runs, this information about the last triangles has to be made explicit.

This is done by determining distances around the bounding loop from either the left or right direction from each branching triangle. For each branching triangle, the distance along the loop from either the left or right vertices to the Y bounding loop node, the left branch boundary length and right branch boundary length, can be computed by recursion. The length of the boundary of a branch starting with a run of length n is equal to $n+n_L+n_R-1$ if the values of the left 3145 and right 3147 orientation fields are opposite to each other. Otherwise, the marching commands associated with the run must be inspected to determine how many edges the run has on the left and right boundary. In that case n does not represent the length of the run, but the difference between the number of left edges and right edges.

If the last triangle of the run has a left jump, then $n_L$ is equal to the value of the left jump. Otherwise, if the last triangle is a leaf it is equal to 1, and equal to the left boundary length if the last triangle is a branching triangle. If the last triangle of the run has a right jump, then $n_R$ is equal to the value of the right jump. Otherwise, if the last triangle is a leaf it is equal to 1, and equal to the right boundary length if the last triangle is a branching triangle.

The branch boundary lengths are computed for each branch as a preprocessing step of the decompression algorithm, and stored in a branch boundary length table. When a branching triangle is encountered during the triangle reconstruction phase, the identity of the corresponding branching vertex can be determined by adding the left branch boundary length to the loop index of the left vertex. Because of the circular nature of the bounding loop table, this addition is performed modulo the length of the bounding loop.

In step 11500, the triangles for the in the triangulated polygon are constructed as groups of three bounding loop nodes. To do this, the table of triangle runs 3130 and the marching record 3180 are used. The triangle root field 3185 of the marching record 3180 identify the three consecutive bounding loop nodes that constitute one of the triangles associated with triangle root node 4610 of the triangle spanning tree 4690. As explained in FIG. 5, the rest of the triangles in each triangle run are reconstructed by advancing on a left or a right side of the run according to the marching commands.

In one preferred embodiment, this is done by recursion with the help of two stacks, the left vertex stack, and the right vertex stack, both initially empty. With the current left and right vertices at the beginning of a triangle run of n triangles, described by a triangle run record of the table of triangle runs, the next n bits of the marching pattern identify how many vertices of the loop are traversed on each side of the strip.

If the triangle last node of the triangle run is a triangle branching node, the bounding loop node associated with the corresponding Y bounding loop node is determined from the information precomputed and stored in the branch boundary length table, and the triangle determined by the current left and right vertices and the Y bounding loop node is reconstructed, the Y bounding loop node and current right vertices are pushed onto the left and right vertex stacks, respectively, and the current right vertex is set equal to the Y bounding loop node. If the triangle last node of the triangle run is a triangle leaf node, the successor to the current right vertex should be equal to the predecessor to the current left and right vertices In this case the leaf triangle is reconstructed and the current left and right vertices are popped off the left and right vertex stacks, if possible. If instead the stacks are empty, the reconstruction process stops because all the triangles have been reconstructed.

The last triangle of one of the triangle run may have jumps. The jumps are used in such a case to determine the third bounding loop node (other than the two bounding loop nodes associated with the last marching edge of the run) that determines the triangle.

In a preferred embodiment, normals, colors, and texture coordinates are quantized, and predictor errors are entropy encoded as in the case of the vertex positions. In another preferred embodiment normals are quantized using Deering's non-rectilinear method.

Figure 13:
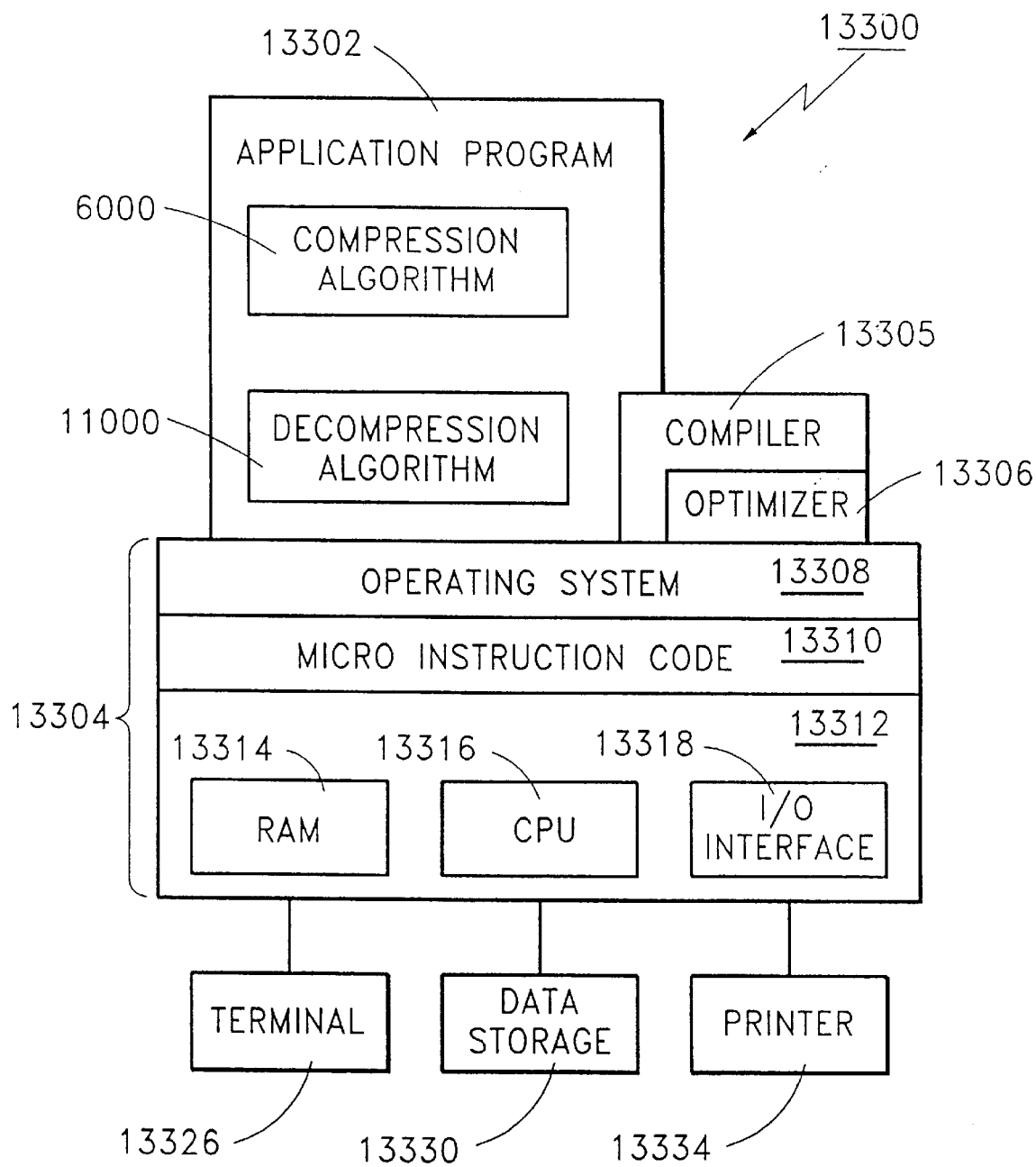
FIG. 13 is a block diagram showing a computer system on which a preferred embodiment of the present invention operates.

FIG. 13 is a block diagram showing an example computer system 13300 on which a preferred embodiment of the present invention operates. The preferred embodiment includes one or more application programs 13302. One type of application program 13302 is a compiler 13305 which includes an optimizer 13306. The compiler 13305 and optimizer 13306 are configured to transform a source (like other application programs 13302) program into optimized executable code. More generally, the source program is transformed to an optimized form and then into executable code. The compiler 13305 and optimizer 13306 operate on a computer platform 13304 that includes a hardware unit 13312. Some application programs 13302 that run on the system 13300 include the compression 6000 and decompression 11000 processes describe above.

The hardware unit 13312 includes one or more central processing units (CPU) 13316, a random access memory (RAM) 13314, and an input/output interface 13318. Microinstruction code 13310, for instance a reduced instruction set, may also be included on the platform 13304. Various peripheral components may be connected to the computer platform 10304 including a graphical interface or terminal 13326, a data storage device 13330, and a printing device 13334. An operating system 13308 coordinates the operation of the various components of the computer system 13300. An example of computer system 10300 like this is the IBM RISC System/6000 (RISC System/6000 is a trademark of the IBM Corporation.) It is readily understood that those skilled in the computer arts will be familiar with many equivalent computer systems 13300.

Figure 14:
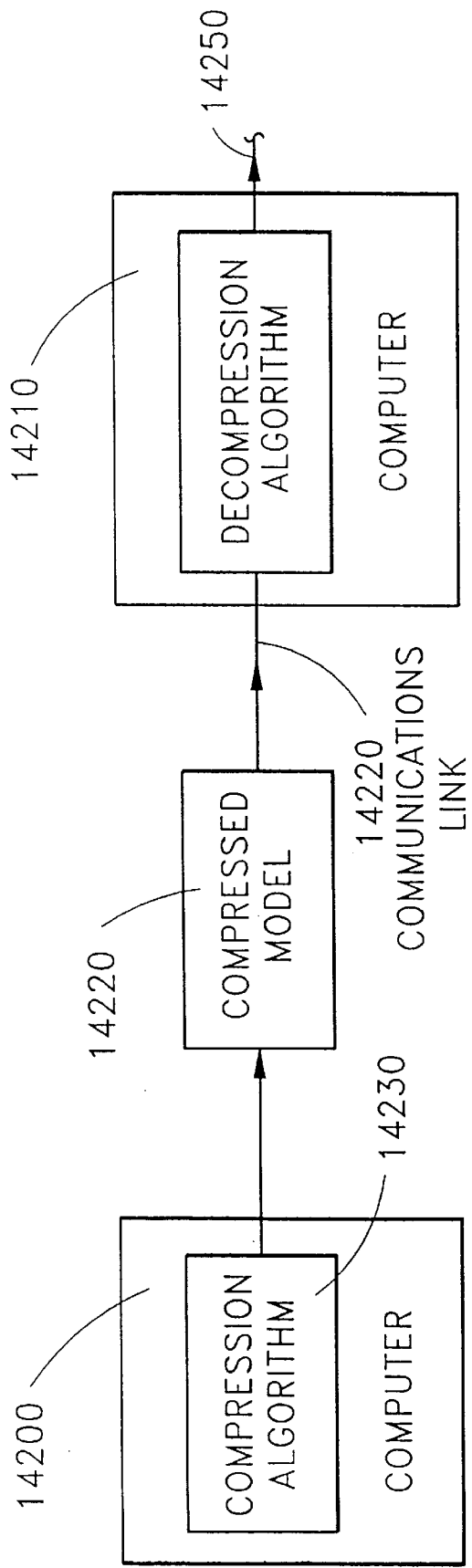
FIG. 14 is a block diagram showing a first computer connected to a second computer through a communications link.

FIG. 14 is a diagram that shows a first computer 14200 connected to a second computer 14210 through a communications link 14220. Examples of communications links are serial links (RS-232), parallel links, radio frequency links, and infra red links. Networks (LAN, WAN) are also prior art examples of communication links. Networks are commonly known. One example of network is the Internet. Other examples are included in U.S. Pat. No. 3,371,852 to Attanasio et. al. filed on Oct. 14, 1992, which is herein incorporated by reference in its entirety. Computer 14200 compresses a triangular mesh by running a geometric compression process 6000 and sends the resulting data structure 3000 trough the communication link 14220. Computer 14210 receives the data structure 3000 and decompresses the triangular mesh by running a geometric decompression process 11000.

Given this disclosure alternative equivalent embodiments will become apparent to those skilled in the art. These embodiments are also within the contemplation of the inventors.

We claim:

1. A data structure stored in a memory of a computer system for representing the connectivity of a connected n-dimensional triangular mesh, the data structure comprising:
   a table of vertex runs with one or more vertex run records that describe a vertex spanning tree connecting two or more vertices on the triangulated mesh, each vertex run record having a vertex last field, a length of vertex run field, and a vertex leaf field;
   a table of triangle runs having one or more triangle run records, each triangle run record having a triangle leaf field indicating if a triangle is a leaf of a triangle run of a triangle tree, a length of triangle run field indicating a length of the the triangle run, and one or more jump information fields each having information about a jump edge in the triangle run, the triangle run being a triangulated polygon cut from the triangular mesh by cutting the triangular mesh along the vertex spanning tree; and
   a marching record having one or more triangle root fields with a triangle root and a sequence of marching commands describing how to construct the triangles in the triangulated polygon with the triangle root as a root.

2. A data structure stored in one or more memories of a computer representing the connectivity of a connected n-dimensional triangular mesh with a plurality of triangles each with three vertices and three edges, each of the edges connecting two of the vertices, the data structure comprising:
   a vertex record describing a rooted vertex spanning tree being a set of one or more of the edges called cut edges, each of the vertices connected to one or more of the cut edges;
   a jump edge record that describes a set of one or more of the edges being jump edges, the jump edges not being in the set of cut edges; and
   a polygon record describing one or more triangulated polygons, each triangulated polygon having one or more polygon triangles, each of the polygon triangles corresponding to a respective triangle in the connected n dimensional triangular mesh, the triangulated polygons resulting by cutting the connected n dimensional triangular mesh through all of the cut and jump edges.

3. A data structure, as in claim 2, further comprising an associated data record that defines a position of each of the vertices.

4. A data structure, as in claim 3, where the connected n-dimensional triangular mesh is used to represent one of one or more connected components of a general n dimensional triangular mesh.

5. A computer having one or more memories and one or more central processing units (CPUs), the computer further comprising:
   a data structure stored in one or more memories of a computer representing the connectivity of a connected n-dimensional triangular mesh with a plurality of triangles each with three vertices and three edges, each of the edges connecting two of the vertices, the data structure comprising:
   a vertex record describing a rooted vertex spanning tree being a set of one or more of the edges called cut edges, all of the vertices being connected by the cut edges;
   a jump edge record that describes a set of one or more of the edges being jump edges, the jump edges not being in the set of cut edges; and
   a polygon record describing one or more triangulated polygons, each triangulated polygon having one or more polygon triangles, each of the polygon triangles corresponding to a respective triangle in the connected n dimensional triangular mesh, the triangulated polygon resulting by cutting the connected n dimensional triangular mesh through all of the cut and jump edges.

6. A computer, as in claim 5, further comprising a associated data record that defines a position of each of the vertices.

7. A computer, as in claim 5, where one or more of the following is compressed: the vertex record, the jump record, and the polygon record.

8. A computer, as in claim 7, where the records are compressed by any one of the following techniques: Huffman encoding, Arithmetic coding, Shannon-Fano-Elias coding, and Lempel-Ziv coding.

9. A computer, as in claim 5, further comprising one or more communication interfaces connected to one or more networks.

10. A computer, as in claim 9, where the network includes any one of the following: an internet, a intranet, a wide area network, a local area network, a radio frequency link, an infra red link, and a serial communication link.

11. A computer, as in claim 5, where one or more of the following is encrypted: the vertex record, the jump record, and the polygon record.

12. A computer, as in claim 5, further comprising one or more communication interfaces connected to one or more networks, and where the data structure is received from one or more of the networks through one or more of the communication interfaces.

13. A computer, as in claim 5, further comprising one or more communication interfaces connected to one or more networks, and where the data structure is sent to one or more of the networks through one or more of the communication interfaces.

14. A computer having one or more memories and one or more central processing units (CPUs), the computer further comprising:
   a data structure stored in one or more of the memories for representing the connectivity of a connected n-dimensional triangular mesh with a plurality of triangles each with three vertices and three edges, each of the edges connecting two of the vertices, the data structure comprising:
   a table of vertex runs with one or more vertex run records that describe a vertex spanning tree connecting two or more of the vertices on the triangular mesh, each vertex run record having a vertex last field, a length of vertex run field, a vertex leaf field, and a vertex order of traversal;
   a table of triangle runs with one or more triangle run records that describe one or more triangle trees, each triangle tree connecting one or more triangles of the triangle mesh and comprises one or more triangle runs, each triangle run record corresponding to one triangle run, each triangle run record having a triangle leaf field indicating if a triangle is a leaf of a triangle run of a triangle tree, a length of triangle run field indicating a length of the triangle run, and one or more jump information fields each having information about a jump edge in the triangle run, each triangle tree corresponding to a triangulated polygon resulting from cutting the triangular mesh along the vertex spanning tree, the table of triangle runs having a triangle order of traversal;

a marching record having one or more triangle root fields with a triangle root and a sequence of marching commands describing how to construct the triangles in the triangulated polygon with the triangle root as a root; and an associated data record that defines a position of each of the vertices.

15. A computer, as in claim 14, where the vertex order of traversal of the vertex spanning tree includes any one of the following orders: a depth first, a breath first, a preorder, and a postorder.

16. A computer, as in claim 14, where the triangle order of traversal of the triangle spanning tree is determined by the order of triangle run records in the table of triangle runs.

17. A computer, as in claim 14, where the triangle order of traversal of the triangle spanning tree includes any one of the following: depth first, breath first, preorder, and postorder.

18. A computer, as in claim 14, where each of the marching commands is a bit.

19. A computer, as in claim 14, where the data structure further comprises:

one or more additional data records, each additional data record having one or more additional data fields, each additional data field having additional information.

20. A computer, as in claim 19, where the additional information includes one or more of the following: normals, colors, and texture coordinates.

21. A computer system, having two or more computers, each computer having one or more memories, one or more central processing units (CPUs), and one or more communication interfaces connected to and communicating over one or more networks, the system comprising:

a data structure stored in one or more of the memories of one or more of the computers, the data structure representing a connected n-dimensional triangular mesh, the data structure further comprising:

a table of vertex runs with one or more vertex run records that describe a vertex spanning tree connecting two or more vertices on the triangular mesh, each vertex run record having a vertex last field, a length of vertex run field, and a vertex leaf field;

a table of triangle runs with one or more triangle run records that describe one or more triangle trees, each triangle tree connecting one or more triangles of the triangle mesh and comprises one or more triangle runs, each triangle run record corresponding to one triangle run, each triangle run record having a triangle leaf field indicating if a triangle is a leaf of a triangle run of a triangle tree, a length of triangle run field indicating a length of the triangle run, and one or more jump information fields each having information about a jump edge in the triangle run, each triangle tree corresponding to a triangulated polygon resulting from cutting the triangular mesh along the vertex spanning tree, the table of triangle runs having a triangle order of traversal;

a marching record having one or more triangle root fields with a triangle root and a sequence of marching commands describing how to construct the triangles in the triangulated polygon with the triangle root as a root; and an associated data record that defines a position of each the vertices.

22. A data structure, as in claim 21, where the connected n-dimensional triangular mesh is used to represent one of one or more connected components of a general n dimensional triangular mesh.

23. A system, as in claim 21, where one or more of the following is compressed: the table of vertex runs, the table of triangle runs, and the marching record.

24. A system, as in claim 23, where the associated data records are compressed by any one of the following techniques: Huffman encoding, Arithmetic coding, Shannon-Fano-Elias coding, and Lempel-Ziv coding.

25. A system, as in claim 21, where the network includes any one of the following: an internet, a intranet, a wide area network, a local area network, a radio frequency link, an infra red link, and a serial communication link.

26. A system, as in claim 21, where the data the table of vertex runs, the table of triangle runs, and the a marching record is transmitted from one or more of the computers to one or more other of the computers connected by the network.

27. A process, executed by a computer for creating a representation of a connected three dimensional triangular mesh having a plurality of mesh triangles, comprising the steps of:

building a vertex spanning tree and a triangle spanning forest composed of one or more triangle trees, each triangle tree with one or more triangles corresponding to respective mesh triangles in the triangular mesh, the triangles having edges;

determining that one or more of the edges are jump edges;

building a vertex spanning tree table with one or more vertex runs for traversing the vertex spanning tree;

building a triangle spanning tree table with one or more triangle runs for traversing a respective triangle spanning tree; and establishing a marching record that defines how to construct one or more of the triangles in the triangle spanning tree while traversing the triangle spanning tree in a triangle order of traversal.

28. A process, as in claim 27, where building the vertex spanning tree and the triangle spanning forest comprises the following steps:

a. assigning a cost to each edge of the mesh;

b. building the vertex spanning tree as a minimum spanning tree;

c. building the triangle spanning forest as a minimum spanning forest with edges not used in the minimum spanning tree; and d. determining the jump edges as the remaining edges not used in the minimum spanning tree and the minimum spanning forest.

29. A process, as in claim 27, where building the vertex spanning tree and the triangle spanning forest comprises the following steps:

a. choosing a set of one or more current vertices of the triangular mesh;

b. assigning all the triangles containing one or more of the current vertices and that have not been visited to a current triangulated layer;

c. selecting as layer edges all edges of the triangles that have not been assigned and that contain at least one of the current vertices, the unselected edges being separating edges;

d. assigning each of the layer edges to the triangle spanning forest if the layer edge does not create a loop in the triangle spanning forest, otherwise assigning the layer edge to the vertex spanning tree;

e. assigning each of the separating edges to the triangle spanning forest if the layer edge does not create a loop in the triangle spanning forest, otherwise assigning the separating edge to the vertex spanning tree;

f. selecting the vertices of the separating edges as the set of current vertices;

g. repeating steps a through f until there are no more edges; and h. determining the jump edges as the remaining edges neither used in the vertex spanning tree nor in the triangle spanning forest.

30. A decompression process comprising the steps of:

receiving a data structure with a table of vertex runs, an associated data record, a table of triangle runs, and a marching record;

reconstructing one or more vertex positions;

constructing a vertex position array by traversing the table of vertex runs in a vertex order of traversal, the vertex position array having the vertex positions;

constructing a bounding loop by traversing the table of vertex runs;

determining one or more relative indices of one or more Y-bounding loop nodes; and reconstructing and linking one or more triangle strips.

31. A computer system for creating a representation of a connected three dimensional triangular mesh having a plurality of mesh triangles, comprising:

means for building a vertex spanning tree and a triangle spanning forest composed of one or more triangle trees, each triangle tree with one or more triangles corresponding to respective mesh triangles in the triangular mesh, the triangles having edges;

means for determining that one or more of the edges are jump edges;

means for building a vertex spanning tree table with one or more vertex runs for traversing the vertex spanning tree;

means for building a triangle spanning tree table with one or more triangle runs for traversing a respective triangle spanning tree; and means for establishing a marching record that defines how to construct one or more of the triangles in the triangle spanning tree while traversing the triangle spanning tree in a triangle order of traversal.

32. A computer system performing decompression process comprising:

means for receiving a data structure with a table of vertex runs, an associated data record, a table of triangle runs, and a marching record;

means for reconstructing one or more vertex positions;

means for constructing a vertex position array by traversing the table of vertex runs in a vertex order of traversal, the vertex position array having the vertex positions;

means for constructing a bounding loop by traversing the table of vertex runs;

means for determining one or more relative indices of one or more Y-bounding loop nodes; and means for reconstructing and linking one or more triangle strips.

* * * * *